(12) United States Patent
Kapustin et al.

(10) Patent No.: US 12,472,464 B2
(45) Date of Patent: Nov. 18, 2025

(54) ATMOSPHERIC WATER HARVESTER HAVING SUBCOOLER HEAT EXCHANGER

(71) Applicant: Water Harvesting, Inc., Newark, CA (US)

(72) Inventors: Ievgen Kapustin, Newark, CA (US); David S. Kuo, Newark, CA (US); Kent D. Penning, San Juan Bautista, CA (US)

(73) Assignee: Water Harvesting, Inc., Fremont, CA (US)

( * ) Notice: Subject to any disclaimer, the term of this patent is extended or adjusted under 35 U.S.C. 154(b) by 372 days.

(21) Appl. No.: 18/098,879

(22) Filed: Jan. 19, 2023

(65) Prior Publication Data

US 2024/0246026 A1 Jul. 25, 2024

(51) Int. Cl.
*B01D 53/04* (2006.01)
*B01D 53/26* (2006.01)
*B01D 53/28* (2006.01)
*F25B 40/02* (2006.01)
*F25B 41/20* (2021.01)

(52) U.S. Cl.
CPC ....... *B01D 53/261* (2013.01); *B01D 53/0446* (2013.01); *B01D 53/0454* (2013.01); *B01D 53/28* (2013.01); *F25B 40/02* (2013.01); *F25B 41/20* (2021.01); *B01D 2253/204* (2013.01); *B01D 2257/80* (2013.01);
(Continued)

(58) Field of Classification Search
CPC .............. B01D 53/261; B01D 53/0446; B01D 53/0454; B01D 53/28; B01D 53/04; B01D 2253/204; B01D 2257/80; B01D 2259/40088; B01D 2259/652; F25B 40/02; F25B 41/20; F25B 2600/2515

USPC .......... 96/108, 112, 121–123, 126–128, 150; 95/14, 18, 117, 126
See application file for complete search history.

(56) References Cited

U.S. PATENT DOCUMENTS 1,559,762 A 11/1925 Newman
4,180,985 A 1/1980 Northrup, Jr.
(Continued)

FOREIGN PATENT DOCUMENTS

CA 3120865 7/2023
CN 102639540 A 8/2012
(Continued)

OTHER PUBLICATIONS

PCT International Patent Application No. PCT/US23/33101, International Search Report and Written Opinion of the International Searching Authority dated Feb. 8, 2024, 16 pages.
(Continued)

*Primary Examiner* — Frank M Lawrence, Jr.
(74) *Attorney, Agent, or Firm* — Craig R. Miles; CR MILES P.C.

(57) ABSTRACT

Generally, an atmospheric water harvesting system useful in harvesting water from surrounding air. Specifically, a water harvester including a secondary heat exchanger operable in a first mode of the water harvester to absorb heat from the ambient environment to reduce the sensible heat penalty associated with increasing temperature to initiate desorption of water from a water capture material and in particular embodiments operable in a second mode of the water harvester to transfer heat from the desorbed water to the ambient environment.

23 Claims, 9 Drawing Sheets

(52) U.S. Cl.
CPC .............. B01D 2259/40088 (2013.01); B01D 2259/652 (2013.01); F25B 2600/2515 (2013.01)

(56) References Cited

U.S. PATENT DOCUMENTS

| | | | |
|---|---|---|---|
| 4,304,577 | A | 12/1981 | Ito et al. |
| 4,646,541 | A | 3/1987 | Reid et al. |
| 5,565,139 | A | 10/1996 | Walker et al. |
| 5,632,802 | A | 5/1997 | Grgich et al. |
| 5,632,954 | A | 5/1997 | Coellner et al. |
| 6,074,972 | A | 6/2000 | Bratton et al. |
| 6,334,316 | B1 | 1/2002 | Maeda |
| 6,684,648 | B2 | 2/2004 | Faqih |
| 8,500,886 | B2 | 8/2013 | Okano |
| 8,627,673 | B2 | 1/2014 | Hill et al. |
| 8,864,882 | B2 | 10/2014 | Henning et al. |
| 9,134,038 | B2 | 9/2015 | Lee et al. |
| 9,446,969 | B1 | 9/2016 | Redman et al. |
| 10,168,057 | B2 | 1/2019 | Goldsworthy et al. |
| 10,266,737 | B2 | 4/2019 | Van Horn et al. |
| 10,695,741 | B2 | 6/2020 | Motkuri et al. |
| 10,829,913 | B1 | 11/2020 | Ahmed et al. |
| 10,857,855 | B2 | 12/2020 | Tomita et al. |
| 10,948,202 | B2 | 3/2021 | Lee et al. |
| 11,029,045 | B2 | 6/2021 | Woods et al. |
| 11,065,573 | B2 | 7/2021 | Matuska et al. |
| 11,679,339 | B2 | 6/2023 | Van de Mortel |
| 12,000,122 | B2 | 6/2024 | Yaghi et al. |
| 2004/0107832 | A1 | 6/2004 | Tongue et al. |
| 2004/0123615 | A1 | 7/2004 | Yabu |
| 2004/0123616 | A1 | 7/2004 | Lee et al. |
| 2004/0244398 | A1 | 12/2004 | Radermacher et al. |
| 2005/0044862 | A1 | 3/2005 | Vetrovec et al. |
| 2006/0130652 | A1 | 6/2006 | Takewaki et al. |
| 2007/0028769 | A1* | 2/2007 | Eplee ............... B01D 53/06 95/113 |
| 2009/0139254 | A1 | 6/2009 | Landry |
| 2009/0151368 | A1 | 6/2009 | Bar |
| 2009/0260385 | A1 | 10/2009 | Hill et al. |
| 2010/0126344 | A1 | 5/2010 | Stein et al. |
| 2010/0175557 | A1 | 7/2010 | Shih et al. |
| 2011/0056220 | A1 | 3/2011 | Caggiano |
| 2011/0088552 | A1 | 4/2011 | Ike et al. |
| 2011/0296858 | A1 | 12/2011 | Caggiano |
| 2012/0172612 | A1 | 7/2012 | Yaghi et al. |
| 2013/0036913 | A1 | 2/2013 | Fukudome |
| 2013/0061752 | A1 | 3/2013 | Farha et al. |
| 2013/0192281 | A1 | 8/2013 | Nam et al. |
| 2013/0269522 | A1 | 10/2013 | DeValve |
| 2013/0312451 | A1 | 11/2013 | Max |
| 2014/0138236 | A1 | 5/2014 | White |
| 2014/0165637 | A1 | 6/2014 | Ma |
| 2014/0287150 | A1 | 9/2014 | Miljkovic et al. |
| 2014/0326133 | A1 | 11/2014 | Wang et al. |
| 2014/0338425 | A1 | 11/2014 | Kalbassi et al. |
| 2016/0030858 | A1 | 2/2016 | Giacomini |
| 2016/0084541 | A1 | 3/2016 | Aguado et al. |
| 2016/0334145 | A1 | 11/2016 | Pahwa et al. |
| 2017/0008915 | A1 | 1/2017 | Yaghi et al. |
| 2017/0113184 | A1 | 4/2017 | Eisenberger |
| 2017/0129307 | A1 | 5/2017 | Zhou et al. |
| 2017/0211851 | A1 | 7/2017 | Feng et al. |
| 2017/0234576 | A1 | 8/2017 | Kawagoe et al. |
| 2017/0292737 | A1 | 10/2017 | Moon |
| 2017/0354920 | A1 | 12/2017 | Switzer et al. |
| 2018/0043295 | A1 | 2/2018 | Friesen et al. |
| 2018/0171604 | A1 | 6/2018 | Kim et al. |
| 2018/0209123 | A1 | 7/2018 | Bahrami et al. |
| 2018/0261882 | A1 | 9/2018 | Chang et al. |
| 2019/0100903 | A1 | 4/2019 | Panda et al. |
| 2019/0234053 | A1 | 8/2019 | Kim et al. |
| 2019/0323714 | A1 | 10/2019 | Cui |
| 2020/0009497 | A1 | 1/2020 | Matuska et al. |
| 2020/0182734 | A1 | 6/2020 | Ueno et al. |
| 2020/0206679 | A1 | 7/2020 | Stuckenberg |
| 2020/0283997 | A1 | 9/2020 | Salloum et al. |
| 2020/0316514 | A1 | 10/2020 | Fuchs et al. |
| 2020/0363078 | A1 | 11/2020 | Mulet et al. |
| 2021/0062478 | A1 | 3/2021 | Friesen et al. |
| 2021/0156124 | A1 | 5/2021 | Yaghi et al. |
| 2021/0237535 | A1 | 8/2021 | Goel et al. |
| 2021/0283528 | A1* | 9/2021 | Pokorný ............... B01D 5/0003 |
| 2021/0283574 | A1 | 9/2021 | Yaghi et al. |
| 2021/0394114 | A1* | 12/2021 | Schmaelzle ......... B01D 53/261 |
| 2022/0001328 | A1 | 1/2022 | Yoon et al. |
| 2022/0106203 | A1 | 4/2022 | Marchon et al. |
| 2022/0170247 | A1 | 6/2022 | Yaghi et al. |
| 2022/0389691 | A1 | 12/2022 | Kuo et al. |
| 2023/0063572 | A1* | 3/2023 | Kapustin ............... F24F 11/0008 |
| 2023/0228066 | A1* | 7/2023 | Perkin ................... E03B 3/28 95/113 |
| 2023/0264138 | A1 | 8/2023 | McGrail et al. |

FOREIGN PATENT DOCUMENTS

| | | |
|---|---|---|
| CN | 106029674 A | 10/2016 |
| CN | 205718197 | 11/2016 |
| CN | 1077722290 A | 2/2018 |
| CN | 114182784 A | 3/2022 |
| CZ | 2018-337 | 7/2019 |
| EP | 0816225 A1 | 1/1998 |
| EP | 2507247 A1 | 10/2012 |
| EP | 3721971 A1 | 10/2020 |
| GB | 2540798 A | 2/2017 |
| JP | S63-107720 A | 5/1988 |
| JP | 2013-512223 A | 4/2013 |
| JP | 2017-509607 A | 4/2017 |
| JP | 2018080146 A | 5/2018 |
| WO | WO 03/097216 A1 | 11/2003 |
| WO | WO 2015/127033 A1 | 8/2015 |
| WO | WO2016/186454 A1 | 11/2016 |
| WO | WO 2018/118377 A1 | 6/2018 |
| WO | WO 2018/230430 A1 | 12/2018 |
| WO | WO 2019/010102 A1 | 1/2019 |
| WO | WO 2019/058158 A1 | 3/2019 |
| WO | WO 2019/082000 A1 | 5/2019 |
| WO | WO 2019/152962 A2 | 8/2019 |
| WO | WO 2020/036905 A1 | 2/2020 |
| WO | WO 2020/099561 A1 | 5/2020 |
| WO | WO 2020/112899 | 6/2020 |
| WO | WO 2020/154427 A1 | 7/2020 |
| WO | WO 2021/034477 A1 | 2/2021 |
| WO | WO 2021/067179 A1 | 4/2021 |
| WO | WO 2021/162894 A1 | 8/2021 |
| WO | WO 2023/146800 A1 | 8/2023 |
| WO | WO 2023/181058 A1 | 9/2023 |

OTHER PUBLICATIONS

United States U.S. Appl. No. 17/763,413, Office Action mailed Feb. 6, 2024.

United States U.S. Appl. No. 18/077,417, Office Action mailed Mar. 29, 2024.

United States U.S. Appl. No. 18/371,700, Office Action mailed Apr. 18, 2024.

Canivet et al. Water adsorption in MOFs: fundamentals and applications. Chem. Soc. Rev., Aug. 2014, 43(16):5594-5617.

Clus et al. Study of dew water collection in humid tropical islands. Hydrol., Oct. 2008, 361(1-2):159-171.

Fathieh et al. Practical water production from desert air. Sci. Adv., Jun. 2018, 4(6):eaat3198.

Klemm et al. Fog as a Fresh-Water Resource: Overview and Perspectives. Ambio, May 2012, 41(3):221-234.

Lee et al. Water harvest via dewing. Langmuir, Jun. 2012, 28(27):10183-10191.

Muselli et al. Dew water collector for potable water in Ajaccio (Corsica Island, France). Atmos. Res., Sep. 2002,64,297-312.

Park et al. Optimal Design of Permeable Fiber Network Structures for Fog Harvesting. Langmuir, Oct. 2013, 29(43):13269-13277.

(56) References Cited

OTHER PUBLICATIONS

Schemenauer et al. A Proposed Standard Fog Collector for Use in High-Elevation Regions. Appl. Meteorol., Nov. 1994, 33(11):1313-1322.

Wahlgren. Atmospheric Water Vapour Processor Designs for Potable Water Production: A Review. Water Res., Jan. 2001, 35(1):1-22.

PCT International Patent Application No. PCT/IN23/50258, International Search Report and Written Opinion of the International Searching Authority dated Jul. 4, 2023, 10 pages.

Japanese Patent Application No. 2021-529709, Office Action dated Nov. 21, 2023, 6 pages.

U.S. Appl. No. 18/384,992, Office Action mailed Jan. 23, 2024.

U.S. Appl. No. 18/077,417, Office Action mailed Jan. 17, 2024.

European Patent Application No. 21754205.9, Extended European Search Report mailed Apr. 19, 2024. 8 pages.

Singapore Patent Application No. 11202252723Y, Office Action mailed Oct. 31, 2024, 8 pages.

European Patent Application No. EP 19891188.5, Office Action dated Jan. 26, 2024, 7 pages.

European Patent Application No. EP 19891188.5, Response to Office Action filed Apr. 9, 2024, 14 pages.

Lu et al. Tuning the structure and function of metal-organic frameworks via linker design. Chemical Society Reviews, Jan. 2014, 43(16):5561-5593.

Gleick. Water in Crisis: A Guide to the World's Fresh Water Resources. Chapter 2, pp. 13-24. Aug. 1993, Oxford University Press, New York, USA.

PCT International Patent Application No. PCT/US23/33098, International Search Report and Written Opinion of the International Searching Authority dated Nov. 30, 2023, 11 pages.

U.S. Appl. No. 17/424,147, Office Action mailed Oct. 2, 2023.

Brazilian Patent Application No. BR112021010139-0, Office Action mailed Jul. 9, 2023, 4 pages.

Brazilian Patent Application No. BR112021002648-7, Office Action mailed Jul. 3, 2023, 4 pages.

Canadian Patent Application No. 3,171,282, Office Action dated Oct. 27, 2023, 11 pages.

Canadian Patent Application No. 3,167,734, Office Action dated Aug. 31, 2023, 6 pages.

Philippine Patent Application No. Jan. 2021/551201, Substantive Examination Report dated Sep. 6, 2023, 6 pages.

PCT International Patent Application No. PCT/US22/26153, International Search Report and Written Opinion of the International Searching Authority dated Jul. 28, 2022, 18 pages.

PCT International Patent Application No. PCT/US19/63442, International Search Report and Written Opinion of the International Searching Authority dated Jan. 22, 2020, 7 pages.

PCT International Patent Application No. PCT/US20/14647, International Search Report and Written Opinion of the International Searching Authority dated May 5, 2020, 11 pages.

PCT International Patent Application No. PCT/US20/53052, International Search Report and Written Opinion of the International Searching Authority dated Jan. 4, 2021, 10 pages.

PCT International Patent Application No. PCT/US21/16261, International Search Report and Written Opinion of the International Searching Authority dated Apr. 16, 2021, 8 pages.

PCT International Patent Application No. PCT/US21/47491, International Search Report and Written Opinion of the International Searching Authority dated Dec. 7, 2021, 9 pages.

PCT International Patent Application No. PCT/US22/12990, International Search Report and Written Opinion of the International Searching Authority dated Apr. 7, 2021, 14 pages.

Ding et al. Carbon capture and conversion using metal-organic frameworks and MOF-based materials. Chem. Soc. Rev., May 2019, 48(2):2783-2828.

Fracaroli et al. Metal-Organic Frameworks with Precisely Designed Interior for Carbon Dioxide Capture in the Presence of Water. Am. Chem. Soc., Jun. 2014, 136, pp. 8863-8866.

Furukawa et al. Water Adsorption in Porous Metal-Organic Frameworks and Related Materials. J. Am. Chem. Soc., Mar. 2014, 136, 11, 4369-4381.

Hanikel et al. Rapid Cycling and Exceptional Yield in a Metal-Organic Frameworks for Water Harvester. ACS Cent. Sci., Aug. 2019, 5(10):1699-1706.

Kalmutzki et al. Metal-Organic Frameworks for Water Harvesting from Air; Adv. Mater. Sep. 2018, 30(37):1704304.

Kim et al. Water harvesting from air with metal-organic frameworks powered by natural sunlight. Science, Apr. 2017, 356:430-434.

Kummer et al. A functional full-scale heat exchanger coated with aluminum fumarate metal-organic framework for adsorption heat transformation. Ind. Eng. Chem. Res., Jul. 2017, 56(29):8393-8398.

Li et al. Incorporation of Alkylamine into Metal-Organic Frameworks through a Brønsted Acid-Base Reaction for $CO_2$ Capture. ChemSusChem., Oct. 2016, 9(19):2832-2840.

Tu et al. Progress and Expectation of Atmospheric Water Harvesting. Joule, Aug. 2018, 2(8):1452-1478.

Zhou et al. Atmospheric Water Harvesting: A Review of Material and Structural Designs. ACS Materials Lett., May 2020, 2(7):671-684.

Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.

Fang et al. One-Pot Synthesis of Two-Linker Mixed Al-Based Metal-Organic Frameworks for Modulated Water Vapor Adsorption. Cryst. Growth Des., Aug. 2020, 20, 10, 6565-6572.

Global Cooling Prize. Transaera and partner Haier. Website, https://globalcoolingprize.org/transaera-inc/, originally downloaded Nov. 21, 2022, 3 pages.

PCT International Patent Application No. PCT/US22/41142, International Search Report and Written Opinion of the International Searching Authority dated Jan. 20, 2023, 12 pages.

\* cited by examiner

ATMOSPHERIC WATER HARVESTER HAVING SUBCOOLER HEAT EXCHANGER

I. FIELD OF THE INVENTION

Generally, an atmospheric water harvester useful in harvesting water from surrounding ambient atmosphere. Specifically, water harvester configured to absorb heat energy from the ambient atmosphere to reduce the sensible heat penalty associated with raising the temperature of the water harvester toward steady-state operating conditions, and methods of making the water harvester and methods of using the water harvester to collect water with a reduced sensible energy penalty contribution to total energy cost per liter of collected water.

II. BACKGROUND

Conventionally, the process of harvesting water from surrounding ambient atmosphere using water capture materials comprises a water harvesting cycle including three energy-intensive modes: adsorption of water from the surrounding ambient atmosphere to a water capture material; desorption of water vapor from the water capture material; and condensation of desorbed water vapor into liquid water. The water adsorption mode can be initiated by flowing ambient atmosphere across a desorbed water capture material. The molecules of water in the ambient atmosphere can become adsorbed by the water capture material. The water adsorption mode can conclude when the water capture material becomes partially or fully water saturated. Following the adsorption mode, a water desorption mode can be initiated by directly or indirectly heating the partially or fully water saturated water capture material to release water vapor. The desorption mode can be concluded when the water capture material becomes partially or fully desaturated of water. The condensation mode can be initiated by cooling the water vapor released by the water capture material. The condensation mode can be concluded by partial or full condensation of water from the cooled water vapor. Through repetitive cycles of adsorption, desorption and condensation, water can be harvested from the ambient atmosphere.

In particular configurations of an atmospheric water harvester, the water harvesting cycle can involve desorption of water from the water capture material by operation of a desorption chamber (also referred to as "a first chamber") associated with the condenser side of a refrigeration loop and condensation of desorbed water by operation of a condensation chamber (also referred to as "a second chamber") associated with the evaporator side of a refrigeration loop. The desorption and condensation process can take place concurrently under steady-state conditions where the heat load on the condenser side closely matches the heat load on the evaporator side. Under steady-state conditions, the energy value needed for desorption of water from the water capture material on the condenser side closely matches the energy value recovered from condensation of water on the evaporator side. As a result, the amount of energy input to the compressor in the refrigeration loop can, during steady-state operation of the water harvester, be very low.

However, under certain conditions, the water harvester may not operate in a steady-state condition. As a first example, condenser side temperature may be below the operating temperature required to desorb water from the water capture material. In this example, the condenser side temperature must be increased before water can be desorbed from the water capture material. Additionally, there may not be any condensing energy absorbed on the evaporation side of side of the water harvester. Because the condenser side and the evaporation side of the water harvester are fluidically coupled to each other and decoupled from the ambient environment, the electrical power input to the compressor must be substantially increased to bring the water harvester to a steady-state operation.

As a second example, when the condenser side fluidically couples to a water capture module containing water capture material partially or fully adsorbed with water, there may be a substantial sensible heat penalty associated with raising the temperature of the water capture module to achieve steady-state operation of the water harvester.

Overcoming the substantial sensible heat penalty associated with achieving steady-state operation renders conventional configurations of water harvesters inefficient. There would be a substantial advantage in a water harvester configured to reduce or cancel out the sensible heat penalty associated with achieving steady-state operation, and/or by comparison to conventional water harvesters reduces the total energy cost per liter of water produced during one or more water harvesting cycles.

III. SUMMARY OF THE INVENTION

A broad object of particular embodiments of the invention can be to provide an atmospheric water harvester comprising one or more of: a first chamber adapted or configured to contain or be thermally coupled to a water capture material, wherein the water capture material adsorbs water from surrounding ambient atmosphere in an adsorption mode of the water harvester and desorbs water vapor in a desorption mode of the water harvester; a heating source thermally coupled to the water capture material contained in or fluidically coupled the first chamber, the heat source operable to heat the water capture material to desorb water vapor during the desorption mode of the water harvester; a second chamber fluidically coupled to the first chamber, wherein water vapor carried in an airflow recirculates between the first chamber and the second chamber during the desorption mode of said water harvester; a cooling source thermally coupled to the second chamber, wherein the cooling source operable to cool the water vapor carried in the airflow recirculated between the first chamber and the second chamber during the condensation mode of the water harvester; and a secondary heat exchanger having a configuration in a first mode to fluidically couple the heating source in a refrigeration loop that bypasses the cooling source; and wherein the secondary heat exchanger has a configuration in a second mode to fluidically couple the heating source and the cooling source in a refrigeration loop that bypasses the secondary heat exchanger, or fluidically couples the secondary heat exchanger between the heating source and the cooling source in the refrigeration loop.

In particular embodiments, the heating source can comprise a first heat exchanger through which heated fluid circulates, and wherein the first heat exchanger can be configured to transfer heat from the heated fluid to the water capture material contained in or thermally coupled to the first chamber, and/or the cooling source can comprise a second heat exchanger through which cooled fluid circulates, wherein the second heat exchanger can be configured to transfer heat from the airflow carrying the water vapor contained in the second chamber. In particular embodiments, the heating source can comprise a condenser of a heat pump and/or the cooling source can comprise an evaporator of a heat pump.

Another broad object of the invention can be a method of making a water harvester including one or more of: containing or thermally coupling a water capture material in or to a first chamber, wherein the water capture material adsorbs water from surrounding ambient atmosphere in an adsorption mode of the water harvester, and wherein the water capture material desorbs water vapor in a desorption mode of the water harvester; thermally coupling a heating source to the water capture material contained in or thermally coupled to the first chamber, wherein the heat source can operate to heat the water capture material to desorb water vapor during the desorption mode of said water harvester; fluidically coupling a second chamber to the first chamber to provide a flow path between the first chamber and the second chamber in which an airflow can recirculate between the first chamber and the second chamber, wherein the airflow can carry water vapor from the first chamber to the second chamber in the desorption mode of the water harvester; thermally coupling a cooling source to the second chamber, wherein the cooling source can operate to cool the water vapor carried in the airflow recirculated between said first chamber and said second chamber during the condensation mode of the water harvester; configuring a secondary heat exchanger in a first mode to fluidically couple the heating source in a refrigeration loop to bypass the cooling source; and configuring the secondary heat exchanger in a second mode to fluidically couple the heating source and the cooling source in a refrigeration loop that bypasses the secondary heat exchanger, or fluidically couples the secondary heat exchanger between the heating source and the cooling source in the refrigeration loop.

In particular embodiments, the method can include operating a heat pump configured to provide a condenser as the heating source to transfer heat from a heated fluid to the water capture material contained in or thermally coupled to the first chamber and/or operating a heat pump configured to provide an evaporator as the cooling source to transfer heat from said airflow carrying the water vapor contained in said second chamber.

Another broad object of the invention can be a method of harvesting water from ambient atmosphere, including one or more of: expose ambient atmosphere to a water capture material, wherein the water capture material adsorbs water from the ambient atmosphere in an adsorption mode of the water harvester; operating a heating source thermally coupled to the water capture material contained in or fluidically coupled to the first chamber, the heat source operable to heat the water capture material to desorb water vapor from the water capture material during the desorption mode of the water harvester; recirculating an airflow carrying the water vapor between the first chamber fluidically coupled to the second chamber during the desorption mode of the water harvester; operating a cooling source thermally coupled to the second chamber, wherein the cooling source operates to cool the water vapor carried in the airflow recirculated between the first chamber and the second chamber during a condensation mode of said water harvester; and operating a secondary heat exchanger having configuration in a first mode to fluidically couple the heating source in a refrigeration loop to bypass the cooling source until the heating source obtains a temperature at which the water harvester can achieve a steady-state operation, and operating the secondary heat exchanger having a configuration in a second mode to fluidically couple the heating source and the cooling source in a refrigeration loop that bypasses the secondary heat exchanger, or fluidically couples the secondary heat exchanger between the heating source and the cooling source in the refrigeration loop during steady-state operation of the water harvester.

In particular embodiments, the method includes altering configuration of the secondary heat exchanger to switch between operation of the water harvester in the first mode and operation of the water harvester in the second mode to reduce or cancel the sensible heat penalty associated with increasing the temperature of the first chamber, and/or increasing the temperature of the water capture module thermally coupled to the first chamber, to achieve steady-state operation of the water harvester with reduced energy expenditure which can correspondingly reduce the total energy expenditure per liter of water produced during one or more water harvesting cycles.

In particular embodiments, the method can include operating a controller including a processor communicatively coupled to a non-transitory computer readable memory containing a computer code executable to analyze one or more signals from one or more sensors, wherein the signal varies based on change in one or more of: first chamber temperature, water capture module temperature, first chamber airflow temperature, airflow temperature recirculated between the first chamber coupled to the water capture module, heating source temperature, heating source refrigerant temperature, and based on analysis of the one or more signals, the computer code can be executed to alter configuration of the secondary heat exchanger to switch between operation of the water harvester in the first mode and operation of the water harvester in the second mode of operation to reduce the amount of energy required to overcome the sensible heat penalty associated with achieving steady-state operation of the water harvester which can reduce the total energy expenditure per liter of water produced during one or more water harvesting cycles.

Another broad object of embodiments of the invention can be to provide an airflow heat exchanger through which the airflow recirculated between the first chamber and the second chamber passes to transfer heat between the airflow from said first chamber and the airflow from the second chamber. In particular embodiments, the airflow heat exchanger can be disposed in a fixed spatial configuration, or can be reconfigured during the water harvesting cycle, to transfer heat between the airflow from said first chamber and the airflow from the second chamber at a heat transfer rate which reduces, substantially reduces or cancels the sensible heat penalty, and/or avoids condensation of the water vapor prior entering the second chamber. Particular embodiments can include a controller including a processor communicatively coupled to a non-transitory computer readable memory containing a computer code executable to analyze one or more signals from one or more sensors, wherein the one or more signals vary based on change in one or more of: airflow temperature, airflow humidity, and airflow rate of the airflow passing through the airflow heat exchanger, wherein the controller can operate based on analysis of the signals from the one or more sensors to control one or more of: the heat source, the cooling source, the configuration of the airflow heat exchanger, and the airflow rate through the airflow heat exchanger to reduce or cancel the sensible heat penalty in the system or associated with cooling of the "desorption-to-condensation" airflow and/or heating of the "condensation-to-desorption" airflow to reduce the total energy expenditure per liter of water produced during one or more water harvesting cycles.

Another broad object of the invention can be a method of harvesting water from ambient atmosphere, including one or more of: exposing ambient atmosphere to a water capture material, wherein the water capture material adsorbs water from the ambient atmosphere in an adsorption mode of the water harvester; operating a heating source thermally coupled to the water capture material contained in or fluidically coupled to the first chamber, the heat source operable to heat the water capture material to desorb water vapor from the water capture material during the desorption mode of said water harvester; recirculating an airflow carrying the water vapor between the first chamber and a second chamber fluidically coupled to the first chamber during the desorption mode of said water harvester; operating a cooling source thermally coupled to the second chamber, wherein the cooling source operates to cool the water vapor carried in the airflow recirculated between the first chamber and the second chamber during a condensation mode of said water harvester; and passing the airflow through an airflow heat exchanger to transfer heat between the airflow from the first chamber and the airflow from the second chamber. In particular embodiments, the method includes configuring or reconfiguring the airflow heat exchanger to transfer the heat between the airflow from said first chamber and the airflow from said second chamber at a heat transfer rate, wherein the heat transfer rate can avoid condensation of water vapor before entering the second chamber and/or reduces or cancels the sensible heat penalty in the system or water harvester associated with cooling of the "desorption-to-condensation" airflow and/or heating of the "condensation-to-desorption" to substantially reduce the total energy expenditure per liter of water produced during one or more water harvesting cycles.

In particular embodiments, the method can include operating a controller including a processor communicatively coupled to a non-transitory computer readable memory containing a computer code executable to analyze one or more signals from one or more sensors, wherein the signal varies based on change in one or more of: airflow temperature, airflow humidity, and airflow rate of the airflow passing through the airflow heat exchanger to control one or more of: the heat source, the cooling source, the configuration of the airflow heat exchanger, and the at least one air circulator, to avoid condensation of water vapor before entering the second chamber, and/or reduce or cancel the sensible heat penalty in the system or associated with cooling of the "desorption-to-condensation" airflow and/or heating of the "condensation-to-desorption" airflow to reduce the total energy expenditure per liter of water produced during one or more water harvesting cycles.

Naturally, further objects of the invention are disclosed throughout other areas of the specification, drawings, photographs, and claims.

IV. BRIEF DESCRIPTION OF THE DRAWINGS

Figure 4:
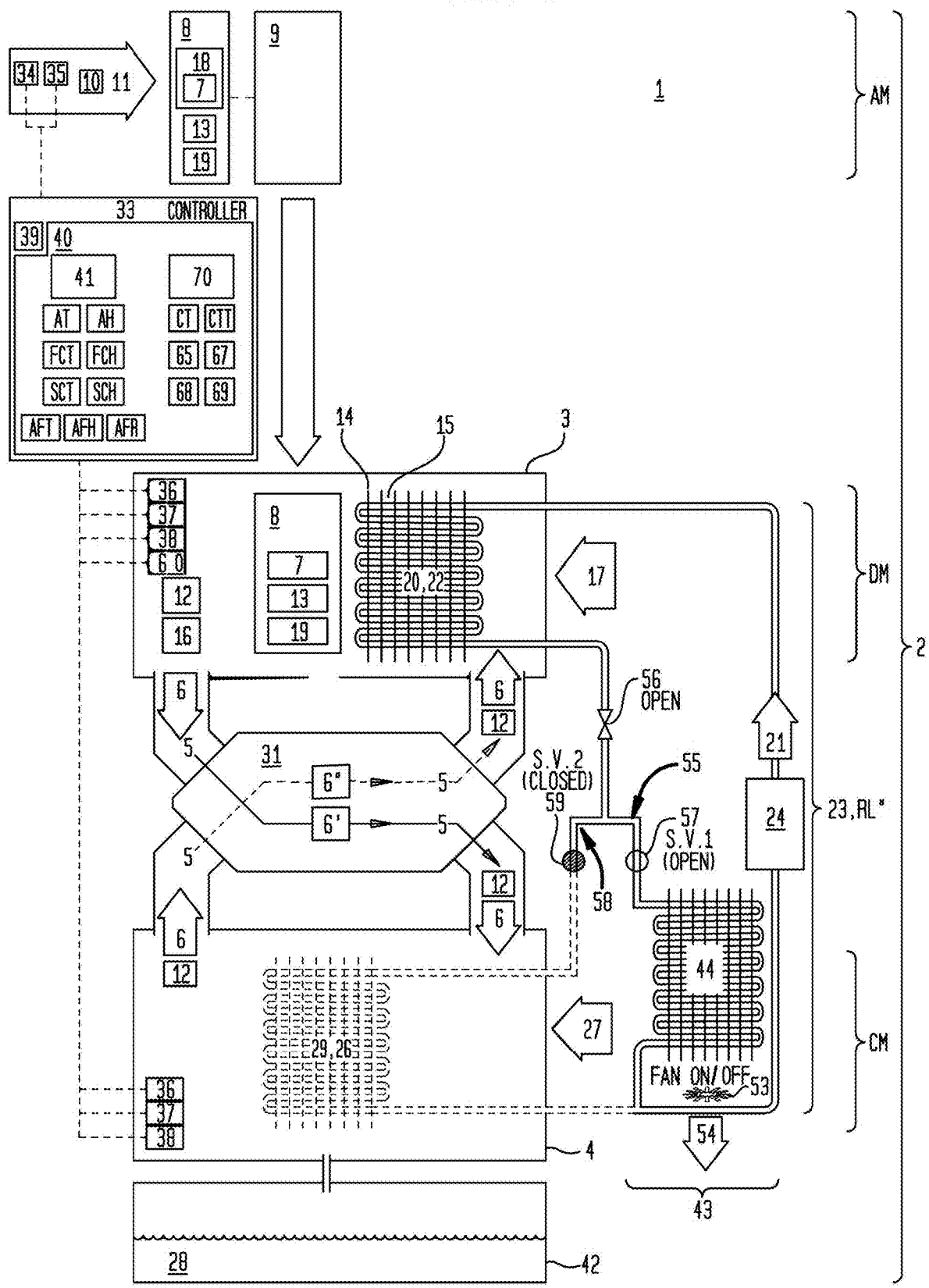

FIG. 4 is a block flow diagram of another embodiment of a water harvesting system including a secondary heat exchanger disposed outside of the first chamber and the second chamber of the water harvester, wherein the secondary heat exchanger in a first mode of operating the water harvester is fluidically coupled between a condenser and a compressor in a refrigeration loop that bypasses the evaporator.

Figure 5:
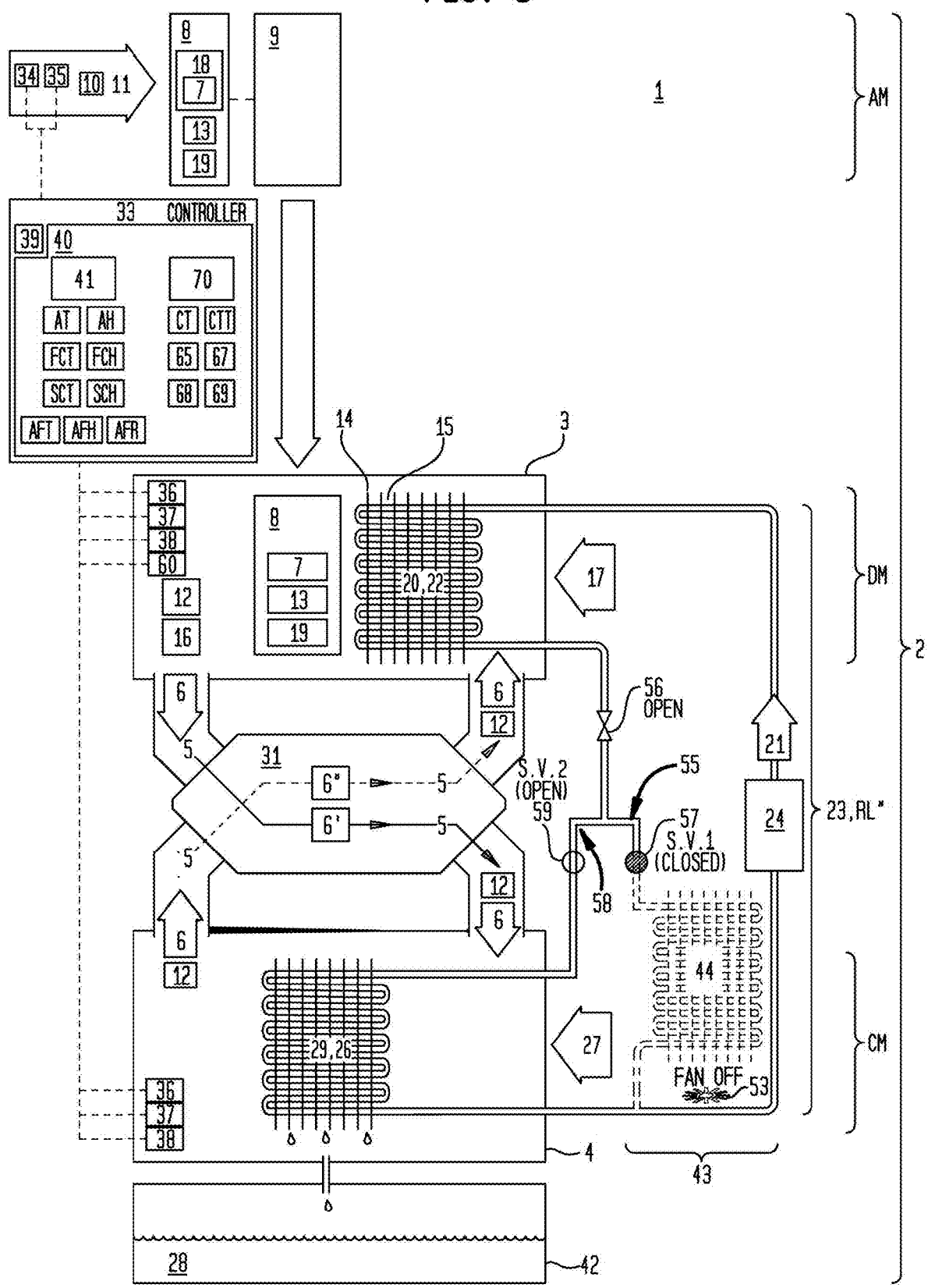

FIG. 5 is a block flow diagram is a block flow diagram of the water harvesting system depicted in FIG. 4 including a secondary heat exchanger disposed outside of the first chamber and the second chamber of the water harvester, wherein the secondary heat exchanger has a configuration in a second mode of operating the water harvester in which the condenser and the evaporator fluidically are coupled to the compressor in a refrigeration loop that bypasses the secondary heat exchanger.

Figure 6:
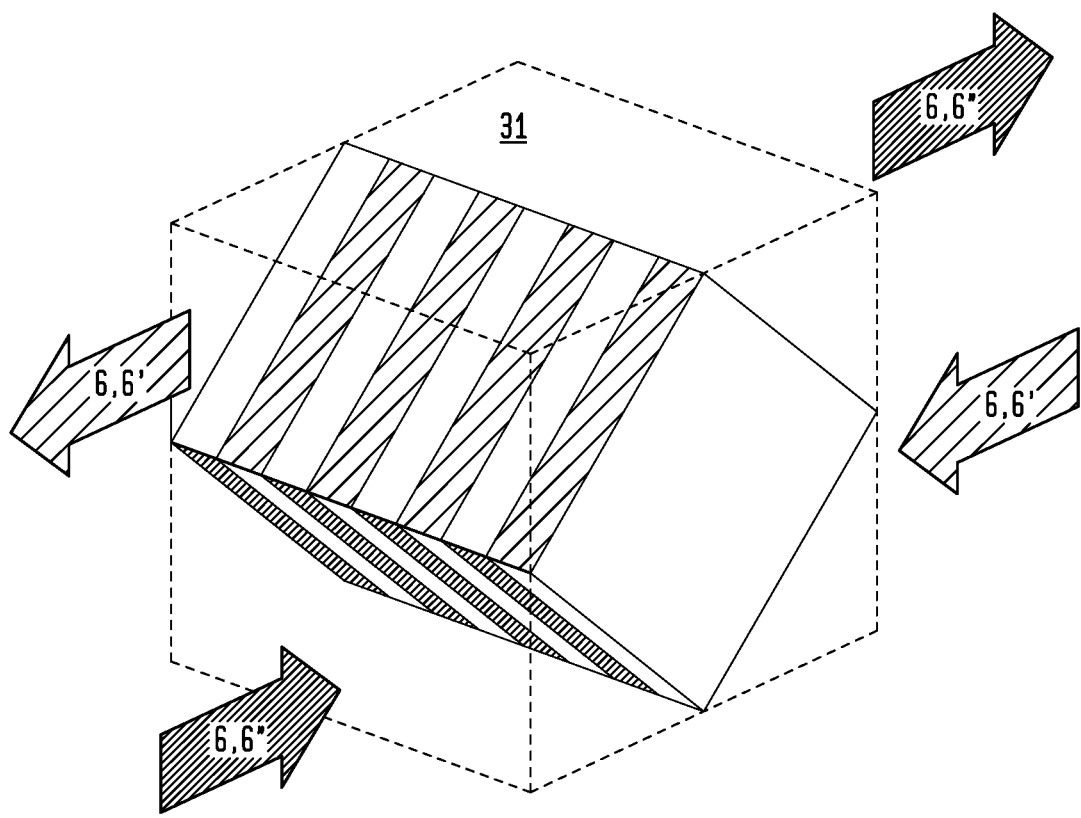

FIG. 6 is a block flow diagram of a particular embodiment of an airflow heat exchanger.

Figure 7:
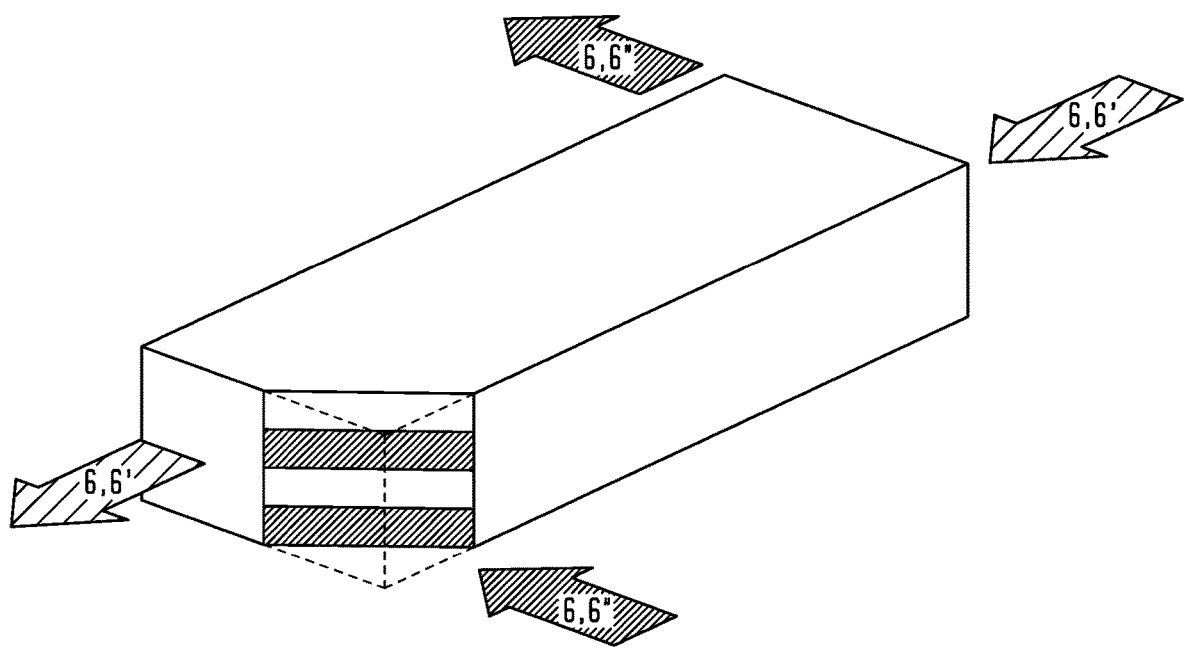

FIG. 7 is a block flow diagram of a particular embodiment of an airflow heat exchanger.

Figure 8:
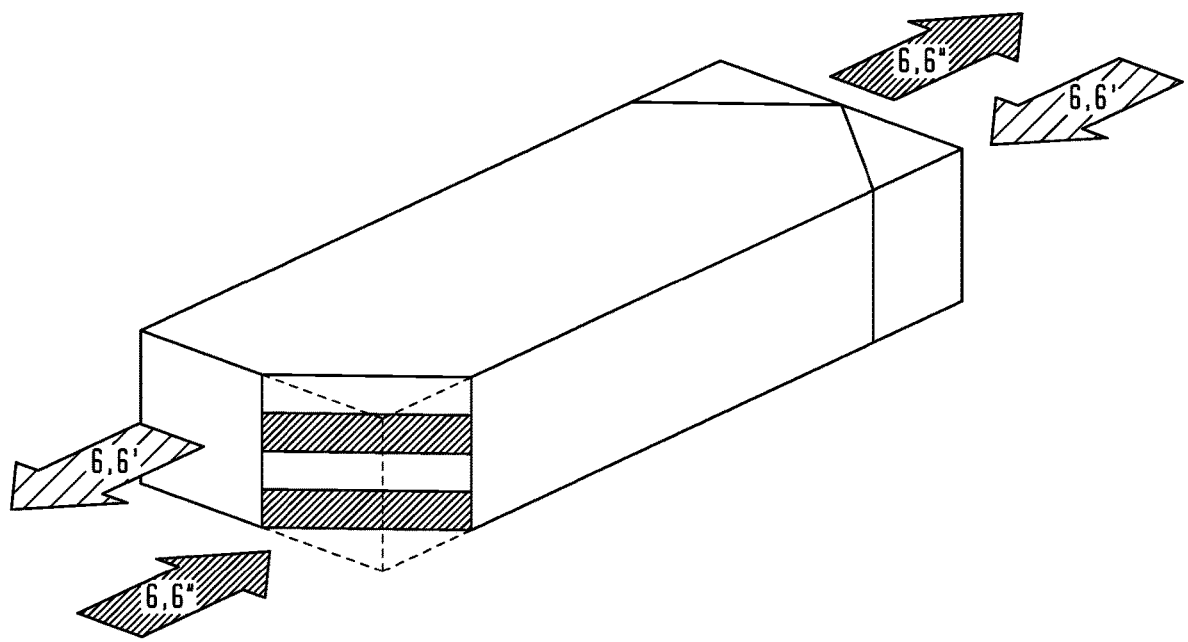

FIG. 8 is a block flow diagram of another particular embodiment of an airflow heat exchanger.

Figure 9:
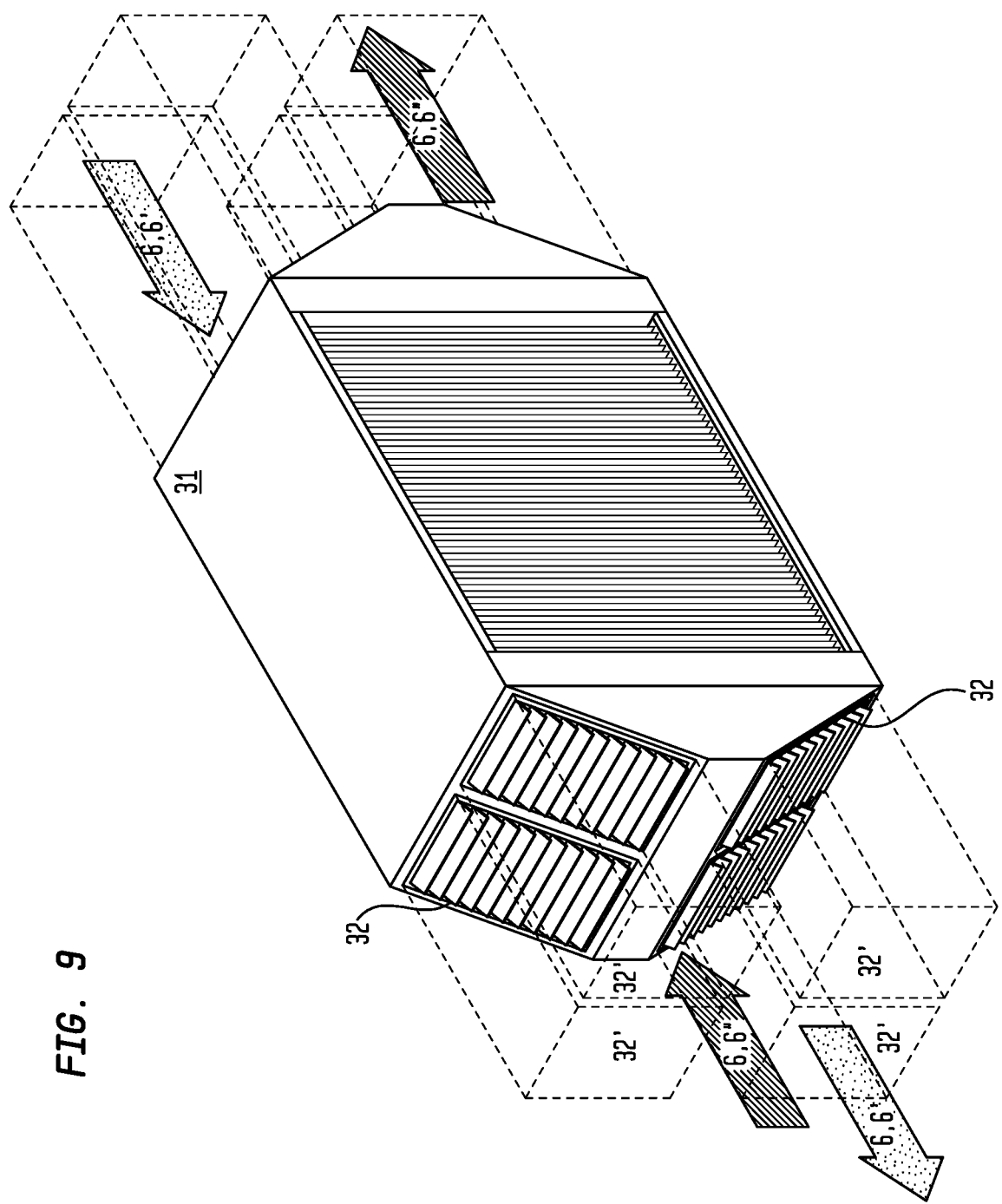

FIG. 9 is a block flow diagram of another particular embodiment of an airflow heat exchanger.

V. DETAILED DESCRIPTION OF THE INVENTION

The following description sets forth illustrative examples of a water harvesting system (1) (also referred to as the "system") including particular embodiments of a water harvester (2), methods of making a water harvester (2), and methods of using water harvester (2). It should be recognized, however, that the examples of the water harvesting system (1), the water harvester (2) and methods of making and using a water harvester (2) provided by the description are not intended to limit the breadth or scope of the description, but instead to provide examples sufficient for a person of ordinary skill in the art to make and use the full breadth and scope of the invention.

Now, with primary reference to FIGS. 1 through 5, embodiments of the water harvester (2) can include a first chamber (3) fluidically coupled to a second chamber (4) which defines a flow path (5) in which an airflow (6) can be recirculated between the first chamber (3) and the second chamber (4). The first chamber (1) can contain a water capture material (7), or hold one or more water capture module(s) (8) containing a water capture material (7), or receive one or more water capture module(s) (8) containing a water capture material (7) transferred by a mechanical transfer mechanism (9), or become fluidically coupled to (or decoupled from) one or more water capture module(s) (8) as part of the flow path (5) in which an airflow (6) can recirculate between the first chamber (3) and the second chamber (4). In particular embodiments, a plurality of water capture modules (8) can be contained in or fluidically coupled in series or parallel to the first chamber (3). The term "airflow" broadly encompasses a mixture of gases contained in one or more components of a water harvester (2), and without sacrificing the breadth of the foregoing, the mixture of gases can be: contained in the first chamber (3);

recirculated between the first chamber (3) fluidically coupled to one or more water capture modules (8); recirculated between the first chamber (3) and the second chamber (4); recirculated between the first chamber (3) and the second chamber (4) during the desorption mode (DM) and/or the condensation mode (CM) of the water harvester (2).

The water capture material (7) comprises a composition that can adsorb water (10) from surrounding ambient atmosphere (11) in an adsorption mode (AM) of the water harvester (2) and which desorbs water vapor (12) in a desorption mode (DM) of the water harvester (2). Any suitable water capture material (7) can be used in embodiments of the water harvesting system (1), the water harvester (2), and methods of making and using a water harvester (2) described herein. In particular embodiments, the water capture material (7) can, but need not necessarily, be one or more metal-organic frameworks ("MOFs"). See for example: H. Furukawa et al., *Water Adsorption in Porous Metal-Organic Frameworks and Related Materials*, J. Am. Chem. Soc. 2014, 136, 11, 4369-4381. MOFs may be characterized by high water uptake and step-like characteristics for water uptake versus relative humidity ("RH"). In some variations, suitable water capture materials (7), including MOFs, can have such an isotherm step, which can be tailored to various climates. See for example: International Patent Publication No. WO2020112899, Multivariate and Other Metal-Organic Frameworks, and Uses Thereof. The isotherm step is typically a weak function of temperature due to hydrogen binding between the MOF and water molecules. The step isotherm can enable water capture and release by MOF in a very narrow range of relative humidity ("RH").

In particular embodiments, different variations or combinations of MOF can be utilized, including one or more of: MOF-303: Al(OH)(HPDC), where HPDC is 1H-pyrazole-3,5-dicarboxylate; CAU-10: Al(OH)(IPA), where IPA is isophthalate; MOF-801: $Zr_6O_4(OH)_4(fumarate)_6$; MOF-841: $Zr_6O_4(OH)_4(MTB)_6(HCOO)_4(H_2O)_2$; Aluminum Fumarate: Al(OH)(fumarate); MIL-160: Al(OH)(FDA), where FDA is 2,5-furandicarboxylate; MIL-53: Al(OH)(TPA), where TPA is terephthalate; or Aluminum Phosphate: AlPO4-LTA. In particular variations, the MOFs can have pore sizes in the range of about 0.5 nm to about 1 nm, or between about 0.7 nm to about 0.9 nm. In certain variations, the MOFs can have a hydrophilic pore structure. In certain variations, the MOFs can have a hydrophilic pore structure comprising acid and/or amine functional groups. In certain variations, the MOFs have one-dimensional channels that allow for reversible water adsorption. In some embodiments, the MOF can be mixed with a binder to improve its properties for adhesion to a substrate or support. Other suitable water capture material (s) (7) may include, as illustrative examples, certain molecular sieves (as one example, SAPO-34 a micropore zeolite, CAS No. 1318-02-1) and certain zeolites having the properties described above. Any combinations of the MOFs described herein, or other MOFs, or other compositions capable of water adsorption and water desorption may also be used alone or in combination.

In particular embodiments, the water capture material (7) can be disposed on one or more structural element(s) (13) located inside of a water capture module (8) or inside of the first chamber (3). The structural element(s) (13) can be configured to increase the surface area of the water capture material (7) exposed to the ambient atmosphere (11) to enhance water (10) adsorption from the ambient air (11) during the adsorption mode (AM) of the water harvester (2) or enhance heat transfer to the water capture material (7) during the desorption mode (DM) of the water harvester (2). In particular embodiments, the structural element(s) (13) can include plates or fins (14) which can be independently coated on one or both sides with the water capture material (7). In some variations, the plates or fins (14) can be arranged in spatial relationship, and in particular embodiments arranged substantially parallel to each other, with a gap (15) existing between adjacent plates or fins (14). In particular embodiments, the gap (15) between adjacent plates relative to the length of each plate can be adjusted to achieve air flow to maximize water adsorption by the water capture material (7) during the adsorption mode (AM) or the desorption mode (DM). In some variations, the gap (15) between adjacent plates or fins (14) can about one percent (1%) to about 5% of the length of a plate or fin (14). In particular embodiments, the plates or fins (14) can be coated with layers of the water capture material (7) each having a thickness between about 10 microns to about 500 microns, or between about 50 microns to 500 microns, or between about 10 microns to about 50 microns. In particular embodiments, layers of water capture material (7) in these thickness ranges can allow for faster adsorption and/or desorption as compared to thicker layers of water capture material (7). In other embodiments, the plates or fins (14) can be coated with layers of the water capture material (7) each having a thickness of about 0.1 centimeter ("cm") to about 1 cm. Thickness in this range may allow for production of larger quantities of water vapor (12) during the desorption mode (DM) as compared to thinner layers. In certain embodiments, each layer of the water capture material (7) on the plates or fins (14) can have a porosity. In some variations, the calculated porosity (the volume of the pores in the water capture material divided by the total volume of the water capture material×100) can be at least about 40%, at least about 50%, at least about 60%, at least about 70%, or at least about 80%; or about 40% to about 90%, about 50% to about 90%, about 40% to about 80%, about 50% to about 80%, or about 60% to about 80%. In other embodiments, the layer of the water capture material (7) can be substantially non-porous. In particular embodiments, the thickness of the layer of the water capture material (7) can be greater than the thickness of a plate or fin for fin (14). In certain embodiments, only one side of the plate of fin (14) may be coated with water capture material (7) with the thickness of the water capture material relative to the thickness of the plate of fin (14) adapted to reduce or minimize the amount of energy used per unit of water released from the water capture material (7) during the desorption mode (DM) of the water harvester (2). Similarly, in certain embodiments, both sides of the plate or fin (14) can be coated with the water capture material (7) and the ratio of the thickness of the first layer (e.g., first side layer) of the water capture material (7) to the thickness of the plate or fin (14) to the thickness of the second layer (e.g., second side layer) of the water capture material (7) can be adapted to reduce or minimize the amount of energy used per unit of water released from the water capture material (7) during the desorption mode (DM) of the water harvester (2). The plates or fins (14) may be made of any suitable material, including any suitable metal or plastic. As an illustrative example, the plates can comprise one or more of aluminum, copper, iron, nickel, tungsten. In some variations, the plates comprise a solid metal. In other variations, each plate or fin (14) can have a cellular design defining small channels or corrugates. In other variations, each plate or fin (14) can further include topographic features that enhance water adsorption. Illustrative examples of topographical features include one or more of: granulation, perforations, arc holes, bumps, ridges, or grooves, or any combination thereof. In another variation, the plates or fins can comprise a mesh.

Again, with primary reference to FIGS. 1 through 5, in the adsorption mode (AM) of the water harvester (2), the water capture material (7) can absorb water (10) from the surrounding ambient air (11). In some embodiments, the structural elements (13) can be designed and arranged to allow for diffusion of water (10) from surrounding ambient air (11) to the water capture material (7) during the adsorption mode (AM). In particular embodiments, an air circulator (16) can operate to generate an airflow (6) at determined velocity through the water capture material (7) to assist adsorption of water (10) by the water capture material (7). As an illustrative example, the water capture material (7) can be coated on adjacent structural elements (13), and ambient atmosphere (11) can passthrough the gap (15) between the structural elements (13) during the adsorption phase. The adsorption mode (AM) of the water harvester (2) can conclude when the water capture material (7) reaches a target level of water saturation and/or a target rate of adsorption.

Now, with primary reference to FIGS. 1 through 5, a heating source (17) can be thermally coupled to the water capture material (7). The water capture material (7) thermally coupled to the heating source (17) can be contained in the first chamber (1), contained in one or more water capture module(s) (8) held in the first chamber (3), contained in one or more water capture modules transferred by a transfer mechanism (9) to the first chamber (3), or contained in one or more water capture modules (8) fluidically coupled as part of the flow path (5) in which the airflow (6) can recirculate between the first chamber (3) and the second chamber (4). The heat source (17) can operate to heat the water capture material (7) to desorb water vapor (12) during the desorption mode (DM) of the water harvester (2). There are two heating methods to release water vapor (12) from the water capture material (7): first, direct heating that involves heat transfer from the heat source (17) directly to the surface of first chamber surface (3), to structural elements (13) supporting the water capture material (7), or to the water capture material (7), or combinations thereof; and second, indirect heating that involves heating the space inside of the first chamber (3), surrounding the structural elements (13) supporting the water capture material (7), or the water capture material (7). The heat source (17) can comprise any mechanism, object, area, material, composition, byproduct, waste energy, or energy, and combinations thereof, that can used to sufficiently heat the water capture material (7) to release water vapor (12). Typically, the heat source (3) operates at temperatures in the range of about 50° C. (about 122° F.) to about 160° C. (about 320° F.). Specific temperatures within the temperature range can be dependent upon the water capture material(s) (7), or combinations of water capture materials (7), utilized in the water harvesting system (1) or water harvester (2). However, this is not intended to preclude embodiments which exploit temperatures outside the range to release water vapor (12) from the water capture material (7).

In particular embodiments, direct heating can comprise at least one structural element (13) being a conductive element (19) resistively heated by flowing electricity to facilitate desorption of water vapor (12) from the water capture material (7) coated on the conductive element (19). In some embodiments, electrical power applied to the conductive element (19) can be tailored to achieve a pre-determined desorption time, as the rate of water desorption is related to the applied electrical power.

In particular embodiments, indirect heating can comprise using resistive heating in which a resistively heated conductive element (19) transfers heat to the air (18) surrounding the water capture material (7) to release water vapor (12).

In particular embodiments, indirect heating can comprise directing waste heat produced by a machine or other process discrete from the water harvester (2) proximate to or into the first chamber (3).

In particular embodiments, the heating source (17) can comprise a first heat exchanger (20) through which heated fluid (21) circulates. The first heat exchanger (20) can be configured to transfer heat from the heated fluid (21) to the water capture material (7). In certain variations, the first heat exchanger (3) can transfer heat from the heated fluid (21) to one or more of: the structure of the first chamber (3), the structure of one or more water capture modules (8) held or received by the first chamber (3), the structural elements (13) supporting the water capture material (7), or direct to the water capture material (7) coating the heating source (17).

Particular embodiments can include a heat pump (23) including a compressor (24), a metering device (25) to decrease pressure of a refrigerant moving from the condenser (22) to the evaporator (26) (as examples: an expansion valve; a thermostatic expansion valve, an automatic expansion valve, a capillary tube metering device, a fixed orifice metering device, an electric expansion valve, a high side float valve, and low side float valve); a condenser (22) (or hot-side heat exchanger), and an evaporator (26) (or cold-side heat exchanger). In particular embodiments, the heating source (17) can comprise the condenser (22) of a heat pump (23). The compressor (24) can operate to compress a refrigerant resulting in a heated fluid (21) which can be circulated to the condenser (22). The metering device (25) can be configured to receive the heated fluid (21) from the condenser (22). The metering device (25) can operate to allow expansion of the heated fluid (21) to produce a cooled fluid (27). The cooled fluid can circulate to the evaporator (26). In particular embodiments, the condenser (22) (or hot side of the heat exchanger) can be set to operate at temperatures in the range of about 90° C. (about 194° F.) to about 160° C. (about 320° F.), and the evaporator (26) or cold-side heat exchanger can be set to operate at temperatures in the range of about 30° C. (about 86° F.) to about 95° C. (about 203° F.). The condenser (22) can be associated with the first chamber (3) to transfer heat, whether directly or indirectly, to the water capture material (7) contained in, fluidically couple to, or thermally coupled to, the first chamber (3). As illustrative examples, the condenser (22) can be disposed to transfer heat to sufficiently raise the temperature of the water capture material (7) to release water vapor (12) from the water capture material (7) in the desorption mode (DM) of the water harvester (2).

Now, with primary reference to FIGS. 1 through 5, embodiments of the water harvesting system (1) or water harvester (2) can include a second chamber (4) fluidically coupled to the first chamber (3). The water vapor (12) released from the water capture material (7) can be carried in the airflow (6) recirculated in the flow path (5) between the first chamber (3) and the second chamber (4) during the desorption mode (DM) of the water harvester (2). In particular variations, upon reaching a target water vapor concentration in the first chamber (3), the air circulator (16) can operate to recirculate the airflow (6) between the first chamber (3) and the second chamber (4) during the desorption mode (DM) of said water harvester (2). Recirculation of the airflow (6) between the first chamber (3) and the second chamber (4) can initiate the condensation mode (CM) of the water harvester (2).

A cooling source (27) can be thermally coupled to the second chamber (4). The cooling source (27) can operate to cool the water vapor (12) carried in the fluid flow (6) recirculated between said first chamber (3) and the second chamber (4) during the condensation mode (CM) of the water harvester (2). The cooling source (27) can sufficiently cool the water vapor (12) in or passing through the second chamber (4) to cause condensation of at least a portion of the water vapor (12) carried by the airflow (6) into liquid water (28). In particular embodiments, the cooling source (27) can be disposed to cool the structure of the second chamber (4) to a temperature lower than the dewpoint of the fluid flow (6) within the second chamber (4) to cause condensation of at least a portion of the water vapor (12) carried by the fluid flow (6) into liquid water (28). The second chamber (4) can be configured increase the surface area of the internal surfaces of the second chamber (4) to increase condensation of water vapor (12) in the fluid flow (6) within the second chamber (4). In other embodiments, the cooling source (27) can be disposed inside of the second chamber (4) and the fluid flow (6) carrying water vapor (12) can pass over the cooling source (27) to cause condensation of at least a portion of the water vapor (12) within the second chamber (4). In particular embodiments, the cooling source (27) can comprise waste cold produced by a machine or other process discrete from the water harvester (2) directed proximate to or into the second chamber (4). An illustrative example, waste cold can comprise the re-gasification of liquid natural gas from the frozen state. In other embodiments, the cooling source (27) can comprise a second heat exchanger (29) through which a cooled fluid (30) circulates. The second heat exchanger (29) can be disposed proximate to in the second chamber (4) to cool the airflow (6) carrying the water vapor (12) contained in or passing through the second chamber (4). The airflow (6) can be cooled to below the dewpoint to cause condensation of at least a portion of the water vapor (12) into liquid water (28).

In particular embodiments, the cooling source (27) can be an evaporator (26) of a heat pump (23). The evaporator (26) or cold-side heat exchanger can be set to operate at temperatures in the range of about 30° C. (about 86° F.) to about 95° C. (about 203° F.). The evaporator (26) can be associated with the second chamber (4) to transfer heat, whether directly or indirectly, from the airflow (6) carrying water vapor (12) contained in or passing through the second chamber (4). As illustrative examples, the evaporator (26) can be disposed to transfer heat from one or more of the structure of the second chamber (4), from structural elements (13) within the second chamber (4), from the airflow (6) within the second chamber (4), or otherwise disposed to cause a decrease in temperature of the fluid flow (6) sufficient to cause condensation of at least a portion of the water vapor (12) carried by the fluid flow (6) in the condensation mode (CM) of the water harvester (2).

Now, with primary reference to FIGS. 1 through 9, particular embodiments of the water harvester (2) can further include an airflow heat exchanger (31). For the purposes of this invention, the term airflow heat exchanger (31) means any device adapted to or configured to bring portions of the airflow (6) of different temperatures into thermal contact, transferring heat between the first airflow portion (6') and the second airflow portion (6"). As illustrative examples, the term airflow heat exchanger (31) encompasses air to air heat exchangers, parallel heat exchangers, counter flow heat exchangers, cross flow heat exchangers, and combinations thereof. In particular embodiments, the water harvester (2) can include an airflow heat exchanger (31) through which the recirculated airflow (6) passes portions of the fluid flow (6) in parallel flow or counter flow direction in thermal contact to transfer heat between the first fluid flow portion (6') passing from the first chamber (3) to the second chamber (4) to a physically separated second fluid flow portion (6") passing from said second chamber (4) to the first chamber (3). In particular embodiments, hot humid air generated in the first chamber (3) during the desorption mode (DM) of the water harvester (2) and passing from the first chamber (3) can be directed into one or more inlets of the airflow heat exchanger (31). Simultaneously, the cold dry air passing from the second chamber (4) during the condensation mode (CM) of the water harvester (2) can be directed into one or more inlets of the airflow heat exchanger (31) to transfer heat from the hot humid fluid to the cold dry air to correspondingly pre-cool the hot humid air and to pre-heat the cold dry air.

Now, with primary reference to FIGS. 1 through 8, in particular embodiments, the airflow heat exchanger (31) can have a fixed spatial structural configuration. In these embodiments, one or more of: the structural material of airflow heat exchanger (31), the temperature of airflow (6) passing from the first chamber (3), the temperature of the airflow (6) passing from the second chamber (4), and the airflow rate through the airflow heat exchanger (31) can be preselected or coordinated to reduce, substantially preclude or preclude condensation of the water vapor (12) carried by the recirculated airflow (6) prior to entry into the second chamber (4). The coordination of these various parameters, rather than altering the geometry of the counterflow heat exchanger (31), can afford a mechanically less complicated embodiment of the water harvester (2). As shown in the illustrative examples of FIGS. 2 through 5, numerous variations in the internal and external structural geometry of the airflow heat exchanger (31) can be suitable for use with particular embodiments of the invention. An illustrative example of an airflow heat exchanger (31) suitable for use with particular embodiments of the invention can be obtained from Xiamen Air Technology Co., Ltd., No. 80, Siming Industrial Park, Mei Xi Road, Tong'an District, Xiamen 361100, Fujian, China.

China

Figure 1:
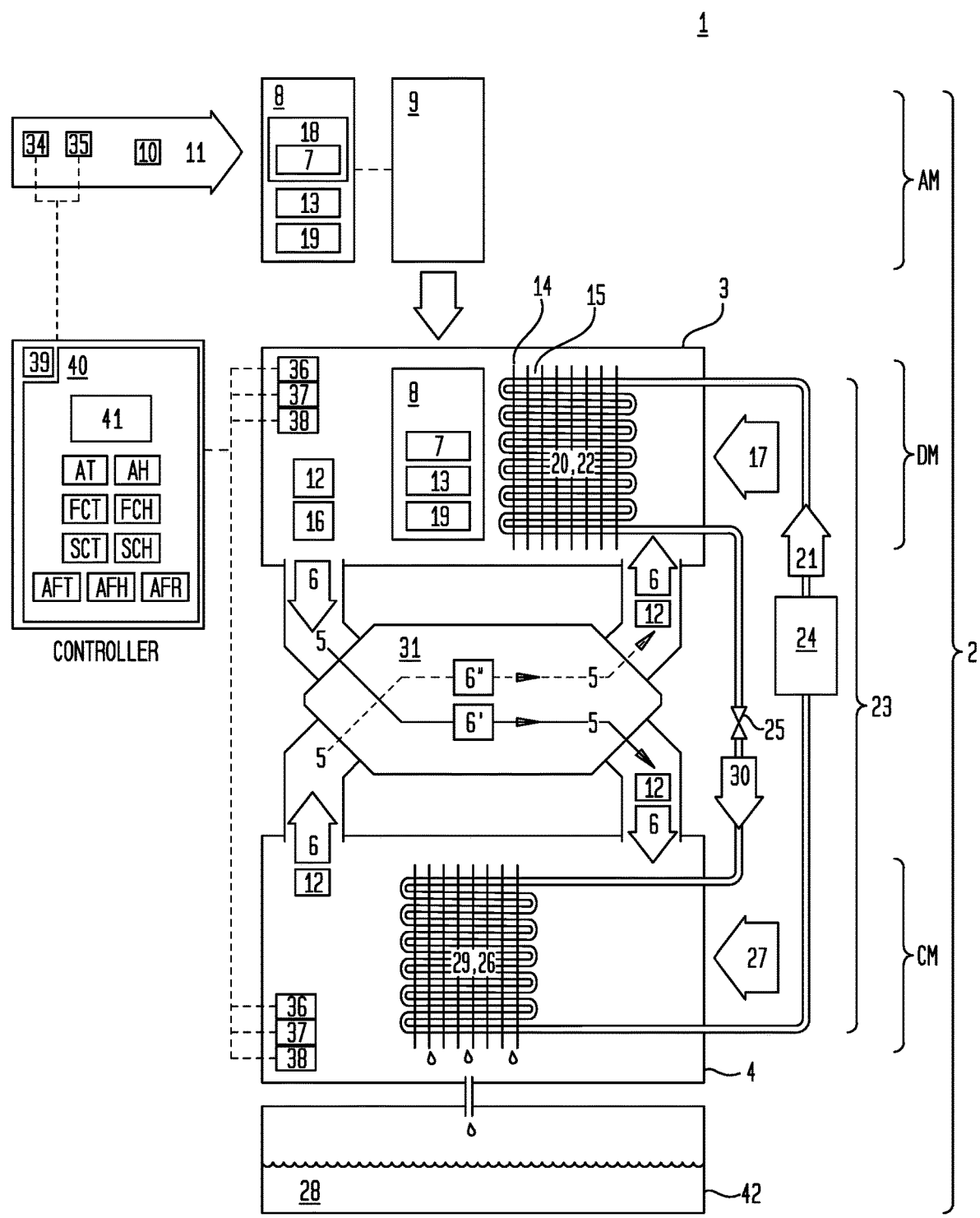
FIG. 1 is a block flow diagram of particular embodiments of the water harvesting system and water harvester including an airflow heat exchanger.

Now, with primary reference to FIGS. 1 and 9, in particular embodiments, the airflow heat exchanger (31) can have a structure that can be reconfigured prior to operation or during operation of the water harvester (2) to adjust transfer of heat between the airflow (6) from the first chamber (3) and the airflow (6) from the second chamber (4). This allows for adjustment of the heat transfer rate to accommodate changes in operating parameters of the water harvester (2) including one or more of: the temperature of airflow (6) passing from the first chamber (3), the temperature of the airflow (6) passing from the second chamber (4), and the airflow rate through the airflow heat exchanger (31). In particular variations this allows for a wider range of operating parameters in the water harvester (2) which concurrently reduce, substantially preclude or preclude condensation of the water vapor (12) carried by the recirculated airflow (6) prior to entry into the second chamber (4). In the illustrative example of FIG. 5, the airflow heat exchanger (31) can include dampers (32) that can be adjusted to alter the open area (32) of one flow path (5) through the airflow heat exchanger (31) to correspondingly adjust the airflow rate from the first chamber (3) and/or the airflow rate from the second chamber (4).

In some variations, the water harvesting system (1) or the water harvester (2) can further include a controller (33) coupled to one or more ambient atmosphere temperature sensors (34) and/or one or more ambient atmosphere humidity sensors (35) located outside of the first chamber (3) and the second chamber (4) adapted to or configured to generate a signal that varies with change in ambient atmosphere temperature and/or ambient atmosphere humidity of the environment surrounding one or more components of the water harvesting system (1), or the water harvester (2). The controller (33) can be respectively coupled to one or more temperature sensors (36) and/or one or more humidity sensors (37) and/or one or more airflow sensors (38) that can be respectively located inside the first chamber (3) and/or the second chamber (4) adapted to or configured to generate a signal that varies with change in the first chamber temperature and/or humidity, and/or second chamber temperature and/or humidity. The controller (33) can include a processor (39) communicatively coupled to a non-transitory computer readable memory (40) containing a water harvesting algorithm (41) (also referred to as the "algorithm") under control of the processor (39) to analyze the signal from each sensor (34, 35, 36, 37, 38) to measure one or more of: the ambient atmosphere temperature (AT), the ambient atmosphere humidity (AH), the first chamber temperature (FCT) and/or first chamber humidity (FCH), the second chamber temperature (SCT) and/or second chamber humidity (SCH), the airflow temperature (AFT), airflow humidity (AFH), and airflow rate (AFR) of the fluid flow (6, 6', 6") passing through the airflow heat exchanger (31), and combinations thereof.

The first chamber temperature (FCT) and/or first chamber humidity (FCH) measurements and/or the second chamber temperature (SCT) and/or the second chamber humidity (SCH) and the ambient atmosphere temperature (AT) and/or ambient atmosphere humidity (AH) measurements can be used under the control of the controller (33) implementing a water harvesting algorithm (41) to adjust operating parameters of the water harvester (2), with respect to one or more of: the period of time allocated to the adsorption mode (AM) in which ambient atmosphere (11) flows over the water capture material (7), the temperature of in the first chamber (3)(FCT) during the desorption mode (DM) and the period of time allocated to the desorption mode (DM), the temperature of the second chamber (4)(SCT) during the condensation mode (CM) and the period of time allocated to the condensation mode (CM), operation of the air circulator (16) to adjust airflow rate (AFR) between the first chamber (3) and the second chamber (4), reconfigure the airflow heat exchanger (31) to increase or decrease the area of the flow path (5) through the airflow heat exchanger (31) in one or both directions, and in particular embodiments control operation of the heat pump (23).

Now, with primary reference to Examples 1 through 4 and Table 1, embodiments of the water harvester (2) that include an airflow heat exchanger (31) can substantially reduce the amount of energy used by the water harvesting system (1) or the water harvester (2) to produce a unit of liquid water (28), which can be directed to a water collection tank (42).

Inclusion of the airflow heat exchanger (31) can substantially reduce or alleviate the sensible energy penalty of the recirculated fluid flow (6) between the first chamber (3) and the second chamber (4). The reduction or alleviation of the sensible energy penalty can reduce the amount of energy used by the water harvesting system (1) to re-heat and to re-cool the fluid flow (6) between the first chamber (3) and the second chamber (4) resulting in a reduction in energy used by the water harvesting system (1) or water harvester (2) to produce a unit of liquid water (28).

An unexpected result also occurs when the sensible heat penalty from both re-cooling and re-heating the fluid flow (6) between the first chamber (3) and second chamber (4) cancels out. In that event, a very substantial unexpected advantage occurs in that the temperature difference between the first chamber (3) and the second chamber (4) can be substantially decreased, which can afford a very substantial increase in the overall energy efficiency of the water harvesting system (1) or the water harvester (2).

Example 1

CAU-10 having an isotherm step of 20% RH at 25° C. (about 77° F.) was used as the water capture material (7). The water capture material (7) was desorbed in the first chamber (3) at a desorption temperature of about 85° C. (about 185° F.). The second chamber (4) was maintained at a condensation temperature of about 30° C. (about 86° F.). No airflow heat exchanger (31) was used in the flow path (5) of the fluid flow (6) between the first chamber (3) and the second chamber (4). The absolute humidity in the first chamber (3) was about 90 grams of water per cubic meter of air (90 g $H_2O/m^3$ air). The absolute humidity in the second chamber was about 30 grams of moisture per cubic meter of air (30 g $H_2O/m^3$ air). The amount of airflow (6) recirculated between the first chamber (3) and the second chamber (4) to desorb one gram (1 g) of water (10) from the water capture material (7) in the first chamber (3) and condense greater than 0.95 gram (>0.95 g) of liquid water (28) in the second chamber (4) was about 0.016 cubic meters of air (0.016 $m^3$ air). The sensible penalty contribution from heating and cooling the recirculated 0.016 $m^3$ of air to desorb 1 g of water (10) from the water capture material (7) in the first chamber (3) and condense >0.95 g of liquid water (28) in the second chamber (4) compared to the total amount of energy used to produce >0.95 g of liquid water (28) in the second chamber (4) was approximately 20%. The total energy cost was about 0.35 kilowatt per liter of water (about 0.35 kWh/L). The sensible heat penalty due to cooling and heating the airflow (6) recirculated between the first chamber (3) and the second chamber (4) was about 0.07 kWh/L.

Example 2

CAU-10 having an isotherm step of 20% RH at 25° C. (about 77° F.) was used as the water capture material (7). The water capture material (7) was desorbed in the first chamber (3) at a desorption temperature of about 85° C. (about 185° F.). The second chamber (4) was maintained at a condensation temperature of about 50° C. (about 122° F.). No airflow heat exchanger (31) was used in the flow path (5) of the fluid flow (6) between the first chamber (3) and the second chamber (4). The absolute humidity in the first chamber (3) was about 80 grams of water per cubic meter of air (80 g $H_2O/m^3$ air). The absolute humidity in the second chamber was about 80 grams of moisture per cubic meter of air (about 80 g $H_2O/m^3$ air). The amount of airflow (6) recirculated between the first chamber (3) and the second chamber (4) to desorb one gram (1 g) of water (10) from the water capture material (7) in the first chamber (3) and condense greater than 0.95 gram (>0.95 g) of liquid water (28) in the second chamber (4) was about 0.108 cubic meters of air (0.108 m³ air). The sensible penalty contribution from heating and cooling the recirculated 0.108 m³ of air to desorb 1 g of water (10) from the water capture material (7) in the first chamber (3) and condense >0.95 g of liquid water (28) in the second chamber (4) compared to the total amount of energy used to produce >0.95 g of liquid water (28) in the second chamber (4) was about 50%. The total energy cost was about 0.50 kWh/L kilowatt per liter of water (about 0.50 kWh/L). The sensible heat penalty due to cooling and heating the airflow (6) recirculated between the first chamber (3) and the second chamber (4) was about 0.25 kWh/L.

Example 3

CAU-10 having an isotherm step of 20% RH at 25° C. (about 77° F.) was used as the water capture material (7). The water capture material (7) was desorbed in the first chamber (3) at a desorption temperature of about 85° C. (about 185° F.). The second chamber (4) was maintained at a condensation temperature of about 30° C. (about 86° F.). An airflow heat exchanger (31) was used in the flow path (5) of the fluid flow (6) between the first chamber (3) and the second chamber (4). The absolute humidity in the first chamber (3) was about 90 grams of water per cubic meter of air (90 g H₂O/m³ air). The absolute humidity in the second chamber was about 30 grams of moisture per cubic meter of air (about 80 g H₂O/m³ air). The amount of airflow (6) recirculated between the first chamber (3) and the second chamber (4) to desorb one gram (1 g) of water (10) from the water capture material (7) in the first chamber (3) and condense greater than 0.95 gram (>0.95 g) of liquid water (28) in the second chamber (4) was about 0.016 cubic meters of air (0.016 m³ air). The sensible penalty contribution from heating and cooling the recirculated 0.108 m³ of air to desorb 1 g of water (10) from the water capture material (7) in the first chamber (3) and condense >0.95 g of liquid water (28) in the second chamber (4) compared to the total amount of energy used to produce >0.95 g of liquid water (28) in the second chamber (4) was reduced to near zero or zero. The total energy cost was about 0.28 kWh/L kilowatt per liter of water (about 0.28 kWh/L).

Example 4

CAU-10 having an isotherm step of 20% RH at 25° C. (about 77° F.) was used as the water capture material (7). The water capture material (7) was desorbed in the first chamber (3) at a desorption temperature of about 85° C. (about 185° F.). The second chamber (4) was maintained at a condensation temperature of about 30° C. (about 86° F.). An airflow heat exchanger (31) was used in the flow path (5) of the fluid flow (6) between the first chamber (3) and the second chamber (4). The absolute humidity in the first chamber (3) was about 90 grams of water per cubic meter of air (90 g H₂O/m³ air). The absolute humidity in the second chamber was about 30 grams of moisture per cubic meter of air (about 80 g H₂O/m³ air). The amount of airflow (6) recirculated between the first chamber (3) and the second chamber (4) to desorb one gram (1 g) of water (10) from the water capture material (7) in the first chamber (3) and condense greater than 0.95 gram (>0.95 g) of liquid water (28) in the second chamber (4) was about 0.108 m³ cubic meters of air (0.108 m³ air). The sensible penalty contribution from heating and cooling the recirculated 0.108 m³ of air to desorb 1 g of water (10) from the water capture material (7) in the first chamber (3) and condense >0.95 g of liquid water (28) in the second chamber (4) was reduced to near zero or zero. The total energy cost was about 0.25 kWh/L kilowatt per liter of water (about 0.25 kWh/L).

TABLE 1

SUMMARY OF RESULTS

| Example | Counter Current Heat Exchanger | Condensation Temperature (deg C.) | Recirculated volume of air needed (m³) | Sensible penalty contribution (%) | Total energy cost (kWh/L) |
|---|---|---|---|---|---|
| 1 | No | 30 | 0.016 | ~20 | <0.35 |
| 2 | No | 50 | 0.108 | >50 | >0.5 |
| 3 | Yes | 30 | 0.016 | ~0 | <0.28 |
| 4 | Yes | 50 | 0.018 | ~0 | <0.25 |

Now, with primary reference to FIGS. 2 through 5, the refrigeration loop (RL) of a heat pump (23) including the compressor (24), the condenser (22), the metering device (25) and the evaporator (26), in particular embodiments, can further include a secondary heat exchanger (43). The secondary heat exchanger (43) can be disposed outside of the first chamber (3) and the second chamber (4). In particular embodiments, the secondary heat exchanger (43) can take the form of interconnected valved conduits and a sub-cooler coil (44) (as shown in the examples of FIGS. 2 through 5); however, these examples are not intended preclude the use of other configurations of a secondary heat exchangers (43) suitable for use in a refrigeration loop (RL) of a heat pump (23) to afford a switchable flow path in which the refrigerant can bypass the evaporator (26) or the sub-cooler coil (44) depending on the mode of operation of the water harvester (2).

Figure 2:
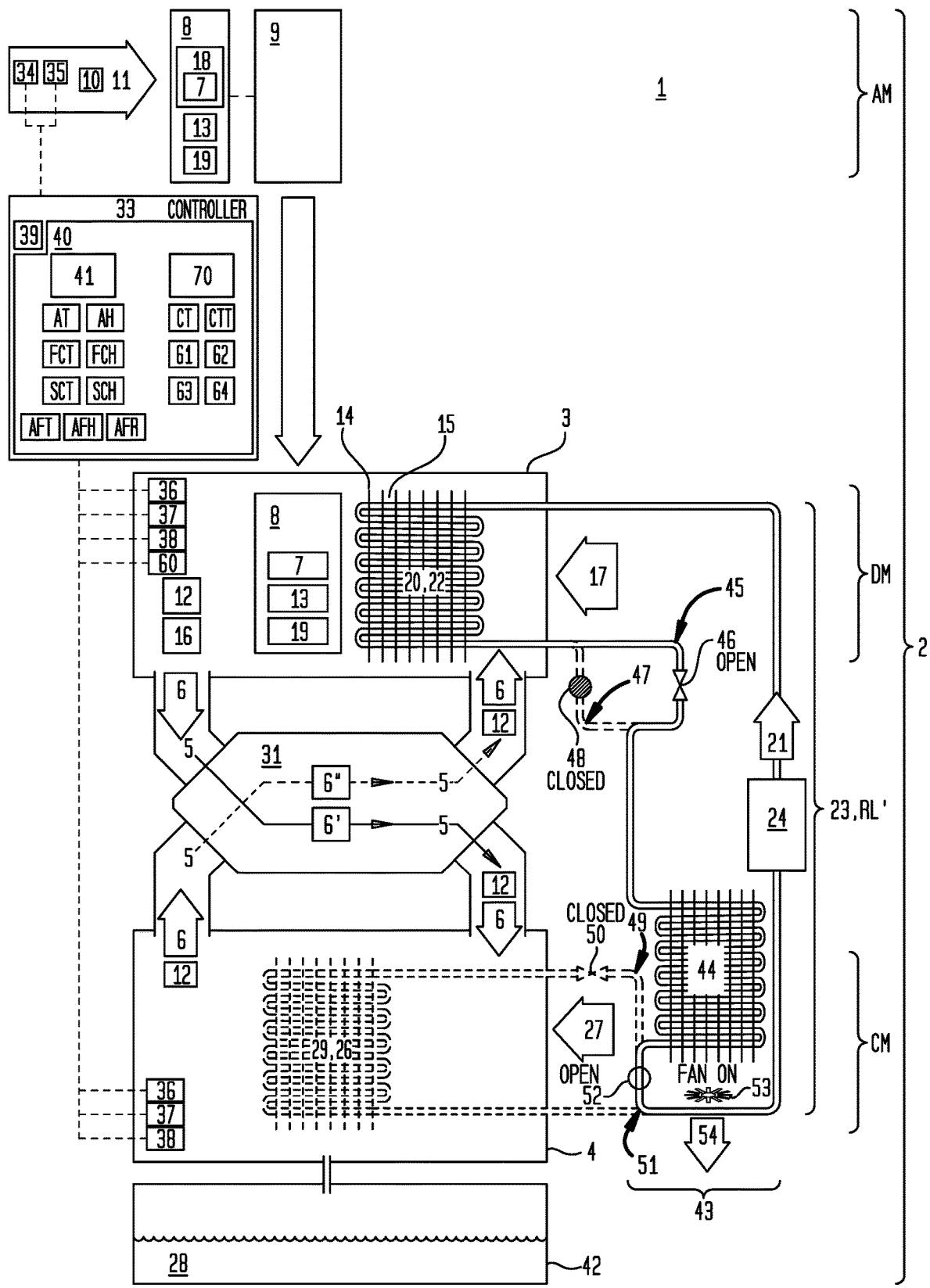
FIG. 2 is a block flow diagram of an embodiment of the water harvesting system including a secondary heat exchanger disposed outside of the first chamber and the second chamber of the water harvester, wherein the secondary heat exchanger in a first mode of operating the water harvester is fluidically coupled between a condenser and a compressor in a refrigeration loop that bypasses the evaporator.

In particular embodiments, the refrigeration loop (RL', RL") can be configured in a first mode of operation (as shown in the examples of FIGS. 2 and 4) to fluidically couple the secondary heat exchanger (43) between the condenser (22) and the compressor (24) of the heat pump (23) to bypass the evaporator (26) (shown in broken line) in the refrigeration loop (RL', RL"). The first mode of operation can be implemented to increase the temperature of the first chamber (3) or condenser (22) to operational levels and/or avoid overcooling of the second chamber (4) or evaporator (26) by fluidically decoupling the evaporator (26) from the refrigeration loop (RL', RL") and maintaining the sub-cooler coil (43) in the refrigeration loop (RL) to absorb heat from the surrounding ambient air (11).

The first mode of operation can be implemented to increase the temperature of the first chamber (3) or condenser (22) during initial startup of the water harvester (2), or to raise the temperature of a water capture module (8) fluidically coupled to the first chamber (3) to initiate desorption of water (10) from the water capture material (7) contained in the water capture module (8). Notably, the first mode of operation in the water harvester (2) can substantially offset the sensible heat penalty associated with the change of temperature of the thermal mass of the first chamber (3) and/or condenser (22) or thermal mass of the water capture module (8) and/or water capture material (7) to achieve a steady-state condition of the water harvester (2) in which the heat load associated with the first chamber (3) and the heat load associated with the second chamber (4) are similar, that is, the energy value needed for desorption of water vapor (12) from the water capture material (7) closely matches that recovered from condensation of water (10) from the water vapor (12).

In particular embodiments, the first mode of operation of can be activated when by comparison the condenser temperature (CT) is below a condenser temperature threshold (CTT) of about 50° C. (about 122° F.) to about 140° C. (about 284° F.). The condenser temperature threshold (CTT) can vary depending upon the water capture material (7) or combination of water capture materials contained in the water capture module (8) to be thermally coupled to the first chamber (3). Depending upon the water capture material the condenser temperature threshold (CTT) can be selected from one or more of the group consisting of: about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., and about 135° C. In particular embodiments, the condenser temperature (CT) used in comparison to the condenser temperature threshold (CTT) can be a measure of the refrigerant temperature in the refrigerant loop (RL), the condenser temperature (CT), the temperature inside the first chamber (3) (FCT), the temperature of the mass of the first chamber, or other measure of temperature within the water harvesting system (1) that affords a temperature value useful in comparison to the condenser temperature threshold (CTT) value to actuate the first mode of operation of the refrigeration loop (RL).

In particular embodiments, the condenser temperature threshold (CTT) can be determined or selected based on an adsorption threshold humidity (ATH) of the water capture material (7) contained in the water capture module (8). The adsorption threshold humidity (ATH) defines the relative humidity (RH) above which the water capture material (7), such as a metal organic framework (MOF), adsorbs water from the surrounding air (18) and below which the water capture material (7), such as a metal organic framework (MOF), desorbs water to the surrounding air (8). As to these embodiments, the condenser temperature threshold (CTT) can have a set point that acts to reduce relative humidity (RH) within said first chamber (3) to below the adsorption threshold humidity (ATH) to desorb the water from the at least one water capture material (7), such as a metal organic framework (MOF) or combination of MOFs.

Figure 3:
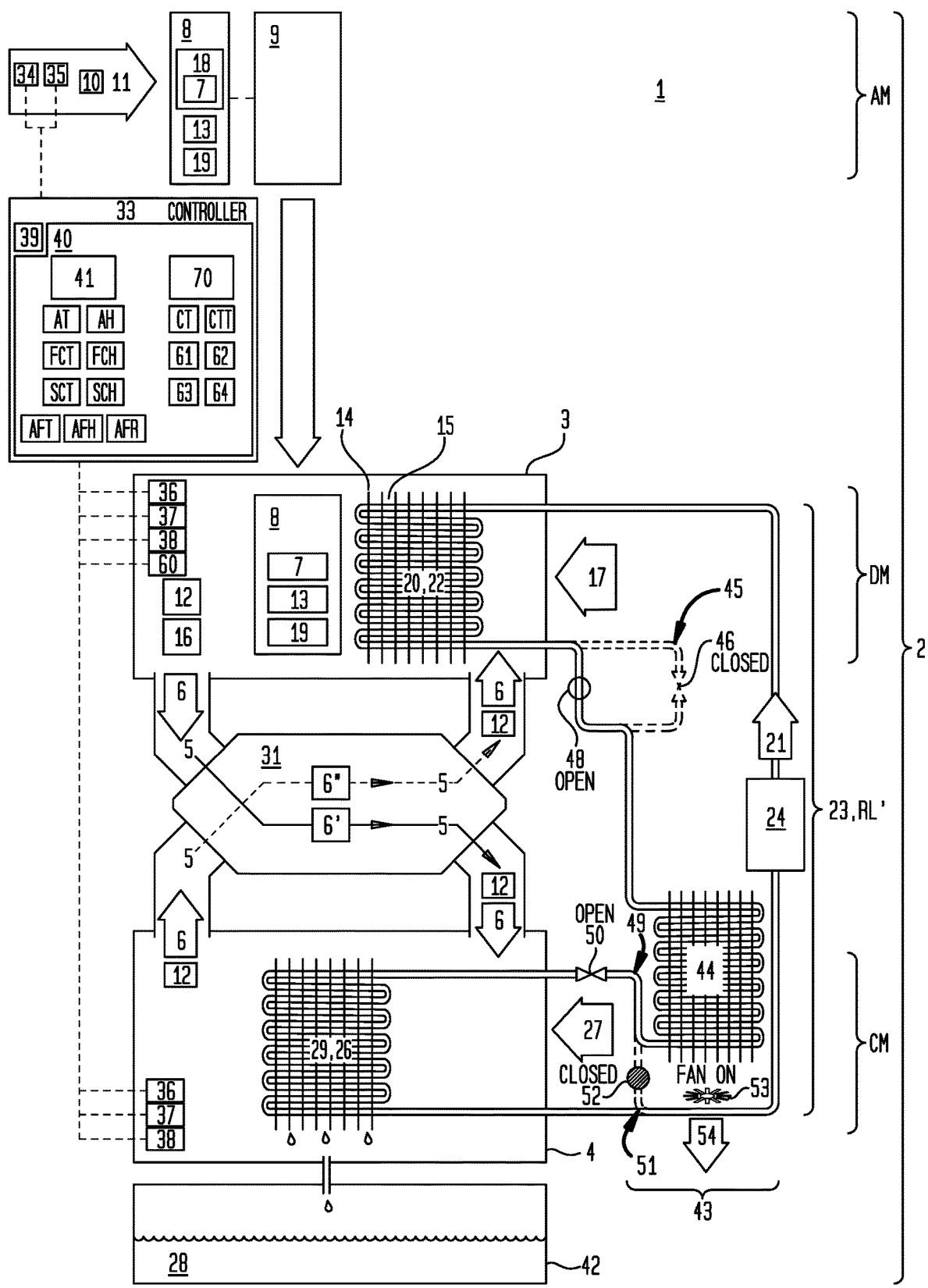
FIG. 3 is a block flow diagram of an embodiment of the water harvesting system depicted in FIG. 2 including a secondary heat exchanger disposed outside of the first chamber and the second chamber of the water harvester, wherein the secondary heat exchanger in a second mode of operating the water harvester is fluidically coupled between the condenser and the evaporator in the refrigeration loop.

The refrigeration loop (RL) can be configured in a second mode of operation (as shown in the examples of FIGS. 3 and 5) to fluidically couple the condenser (22) and the evaporator (26) to the compressor (24) of the heat pump (23) to bypass the sub-cooler coil (44) (as shown in the example of FIG. 5), or fluidically couple the sub-cooler coil (44) between the condenser (22) and the evaporator (26) (as shown in the example of FIG. 3).

In particular embodiments, a condenser temperature sensor (60) can be associated with the first chamber (3) or the condenser (22) or the refrigerant in the refrigerant loop (RL). The condenser temperature sensor (60) can be adapted to or configured to generate a signal that varies with change in the condenser temperature (CT). The controller (33) can contain a mode switching program (70) under control of the processor (39) that can analyze the signal from the condenser temperature sensor (60) to measure the condenser temperature (CT). The mode switching program (70) under control of the processor (39) can further operate to compare the condenser temperature (CT) to the condenser temperature threshold (CTT). The controller (33), based on the comparison of the condenser temperature (CT) to the condenser temperature threshold (CTT) can alter the refrigerant flow path between the first mode of operation and the second mode of operation depending on whether the determined condenser temperature (CT) is above or below the condenser temperature threshold (CTT).

Now, with primary reference to FIGS. 2 and 3, in a first example of a refrigeration loop (RL') operable in the first mode and the second mode as above described, the secondary heat exchanger (43) can include: a sub-cooler coil (44); a first valved conduit (45) fluidically coupled between the condenser (22) and the sub-cooler coil (44) including a first metering device (46); a second valved conduit (47) fluidically coupled between the condenser (22) and the sub-cooler coil (44) to bypass the first metering device (46), wherein the second valved conduit (47) includes a first flow control valve (48); a third valved conduit (49) fluidically coupled between the sub-cooler coil (44) and the evaporator (26) including a second metering device (50); and a fourth valved conduit (51) fluidically coupled between the sub-cooler (44) and the compressor including a second flow control valve (52). In particular embodiments, an air flow generator (53) can operate to generate an ambient airflow (54) through the sub-cooler coil (44) to assist in the transfer of heat from the surrounding ambient air (11).

In particular embodiments, the controller (33) can include valve actuators. The term "actuator" for the purposes of this invention means the controller (33) executing the mode switching program (70) under control of the processor (39) along with the corresponding circuitry and valve actuators to either open or close a corresponding valve. In the example of FIGS. 2 and 3, the controller (33) can include first metering device actuator (61) operable to dispose the first metering device (46) in the open condition or in the closed condition; a second metering device actuator (62) operable to dispose the second metering device (50) in the open condition or in the closed condition; a first flow control valve actuator (63) operable to dispose said first flow control valve (48) in the open condition or in the closed condition; a second flow control valve actuator (64) operable to dispose said second flow control valve (52) in the open condition or in the closed condition; and an airflow generator actuator (65) operable to dispose said airflow generator (53) in the on condition or in the off condition.

In a first example, in the first mode of operation (as shown in the example of FIG. 2), the first metering device (46) and the second flow control valve (52) can be disposed in an open condition and the first flow control valve (48) and the second metering device (50) can be disposed in a closed condition to circulate the refrigerant in the refrigerate loop (RL') from the compressor (24) through the condenser (22) and the first metering device (46) and then through the sub-cooler coil (44) to absorb heat from the surrounding ambient air (11) and return the refrigerant ( ) to the compressor (24) and bypassing the evaporator (26). The first mode of the refrigeration loop continues until the first chamber (3) or the condenser (22) along with any water capture module (7) fluidically coupled to the first chamber (3) exceeds the condenser temperature threshold (CTT).

In the first example, in the second mode of operation (as shown in the example of FIG. 3), the first metering device (46) and the second flow control valve (52) can be disposed in a closed condition and the first flow control valve (48) and the second metering device (50) can be disposed in an open condition to circulate refrigerant in the refrigeration loop (RL') from the sub-cooler coil (44) through the evaporator (26) and return to the compressor (24). In the second mode of operation, the air flow generator (53) can be operated to transfer heat from the sub-cooler coil (44) to the surround ambient air (11). The water harvesting system (1) or water harvester (2) can operate in the second mode in steady-state conditions of the water harvester (2) in which the heat load associated with the first chamber (3) and the heat load associated with the second chamber (4) are similar, that is, the energy value needed for desorption of water vapor (12) from the water capture material (7) closely matches that recovered from condensation of water (10) from the water vapor (12).

Now, with primary reference to FIGS. 4 and 5, a second example of a refrigeration loop (RL") operable in the first mode and the second mode as above described, the secondary heat exchanger (43) can include: a sub-cooler coil (44); a first valved conduit (55) fluidically coupled between an metering device (56) of the heat pump (23) and the sub-cooler coil (44) including a first flow control valve (57); and a second valved conduit (58) fluidically coupled between the metering device (56) of the heat pump (23) and the evaporator (26) including a second flow control valve (59). In particular embodiments, an air flow generator (53) can operate to generate an ambient airflow (54) through the sub-cooler coil (44) to assist in the transfer of heat from the surrounding ambient air (11).

Again, in the example of FIGS. 4 and 5, and as above described, the condenser temperature sensor (60) can be associated with the first chamber (3) or the condenser (22) or the refrigerant in the refrigerant loop (RL). The condenser temperature sensor (60) can be adapted to or configured to generate a signal that varies with change in the condenser temperature (CT). The controller (33) containing the mode switching program (70) under control of the processor (39) can analyze the signal from the condenser temperature sensor (60) to measure the condenser temperature (CT). The mode switching program (70) under control of the processor (39) can further operate to compare the condenser temperature (CT) to the condenser temperature threshold (CTT). The controller (33), based on the comparison of the condenser temperature (CT) to the condenser temperature threshold (CTT) by execution of the mode switching program (70) can alter the refrigeration loop (RL") between the first mode of operation and the second mode of operation depending on whether the determined condenser temperature (CT) is above or below the condenser temperature threshold (CTT).

In the example of FIGS. 4 and 5, the controller (33) can include an metering device actuator (66) operable to dispose the metering device (56) in the open condition or in the closed condition; a first flow control valve actuator (67) operable to dispose said first flow control valve (57) in the open condition or in the closed condition; a second flow control valve actuator (68) operable to dispose said second flow control valve (59) in the open condition or in the closed condition; and an airflow generator actuator (69) operable to dispose the airflow generator (53) in the on condition or in the off condition.

In the second example, in the first mode of operation (as shown in the example of FIG. 4), the metering device (56) and the first flow control valve (57) can be disposed in an open condition and the second flow control valve (59) can be disposed in a closed condition to circulate the refrigerant in the refrigerate loop (RL") from the compressor (24) through the condenser (22) and the metering device (56) and then through the sub-cooler coil (44) to absorb heat from the surrounding ambient air (11) and return the refrigerant to the compressor (24) and bypassing the evaporator (26). In the first mode of operation, the air flow generator (53) can operate to transfer heat from the sub-cooler coil (44) to the surround ambient air (11). The first mode of the refrigeration loop continues until the first chamber (3) or the condenser (22) along with any water capture module (7) fluidically coupled to the first chamber (3) exceeds the condenser temperature threshold (CTT).

In the second example, in the second mode of operation (as shown in the example of FIG. 5), the metering device (56) and the second flow control valve (59) can be disposed in an open condition and the first flow control valve (57) can be disposed in a closed condition to circulate the refrigerant in the refrigerate loop (RL") from the metering device (56) through the evaporator (26) and return to the compressor (24) bypassing the sub-cooler coil (44). In the second example, second mode of operation, the air flow generator (53) can be disposed in the off condition. The water harvesting system (1) or water harvester (2) can operate in the second mode in steady-state conditions of the water harvester (2) in which the heat load associated with the first chamber (3) and the heat load associated with the second chamber (4) are similar, that is, the energy value needed for desorption of water vapor (12) from the water capture material (7) closely matches that recovered from condensation of water (10) from the water vapor (12).

In particular embodiments, and as shown by the specific the examples of FIGS. 2 through 5 and as above described, the sensible heat penalty associated with increasing the temperature of the first chamber and/or associated with increasing the temperature of a water capture module (8) containing water capture material (7) fluidically coupled to the first chamber (3) can be substantially reduced and correspondingly the total energy cost per liter of liquid water (28) produced by said water harvester (2).

As can be easily understood from the foregoing, the basic concepts of the present invention may be embodied in a variety of ways. The invention involves numerous and varied embodiments of a water harvesting system (1), a water harvester (2) and methods for making and using such water harvesting system (1) and water harvester (2) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "water harvester" should be understood to encompass disclosure of the act of "water harvesting"—whether explicitly discussed or not—and, conversely, were there is a disclosure of the act of "water harvesting", such a disclosure should be understood to encompass disclosure of a "water harvester" and even a "means for water harvesting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the water harvesting systems or water harvesters herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. An apparatus, comprising:
    a first chamber thermally coupled to a condenser of a heat pump,
        said first chamber configured to fluidically couple to a water capture module or to receive said water capture module within an interior space of said first chamber; and
    a second chamber thermally coupled to an evaporator of said heat pump,
        said second chamber fluidically coupled to said first chamber;
    a secondary heat exchanger having a sub-cooler coil disposed outside of said first chamber and said second chamber, said secondary heat exchanger configured in a first mode to dispose said sub-cooler coil between said condenser and a compressor in a refrigerant loop of said heat pump bypassing said evaporator, said secondary heat exchanger configured in a second mode to:

fluidically couple said condenser and said evaporator to said compressor in said refrigerant loop bypassing said sub-cooler coil; or fluidically couple said sub-cooler coil between said condenser and said evaporator in said refrigerant loop to said compressor.

2. The apparatus of claim 1, further comprising a water capture module containing at least one water capture material adapted to adsorb water from ambient air, said water capture module thermally coupled to said first chamber or received within the interior space of said first chamber.

3. The apparatus of claim 2, further comprising a controller having a processor communicatively coupled to a non-transitory computer readable medium containing a mode switching program which functions to switch said secondary heat exchanger between said first mode and said second mode based on a condenser temperature.

4. The apparatus of claim 3, wherein said controller switches said secondary heat exchanger to said first mode when said condenser temperature occurs below a condenser temperature threshold within a range of about 50° C. (about 122° F.) to about 140° C. (about 284° F.).

5. The apparatus of claim 4, wherein said condenser temperature threshold is selected from the group consisting of: about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., and about 135° C.

6. The apparatus of claim 4, wherein said condenser temperature threshold set within said range based on an adsorption threshold humidity of said water capture material, wherein said water capture material absorbs water above said adsorption threshold humidity, and wherein water capture material desorbs water below said adsorption threshold humidity.

7. The apparatus of claim 6, wherein said condenser temperature threshold set at a condenser temperature which maintains relative humidity within said first chamber below said adsorption threshold humidity to desorb said water from said water capture material.

8. The apparatus of claim 7, wherein said water capture material comprises a metal organic framework.

9. The apparatus of claim 1, further comprising:

a first valved conduit fluidically coupled between a metering device of said heat pump and said sub-cooler coil including a first flow control valve; and a second valved conduit fluidically coupled between said metering device of said heat pump and said evaporator including a second flow control valve, wherein in said first mode said first flow control valve disposed in an open condition and said second control valve disposed in a closed condition, wherein in said second mode said first control valve disposed in a closed condition and said second control valve in an open condition.

10. The apparatus of claim 9, further comprising an airflow generator associated with said secondary heat exchanger.

11. The apparatus of claim 10, wherein in said first mode said airflow generator is in an on condition to generate airflow through said secondary heat exchanger, and wherein in said second mode said airflow generator is in an off condition.

12. The apparatus of claim 11, further comprising:

a metering device actuator operable to dispose said metering device in said open condition or in said closed condition;

a first flow control valve actuator operable to dispose said first flow control valve in said open condition or in the closed condition;

a second flow control valve actuator operable to dispose said second flow control valve in said open condition or in said closed condition; and an airflow generator actuator operable to dispose said airflow generator in said on condition or in said off condition.

13. The apparatus of claim 1, further comprising:

a first valved conduit fluidically coupled between said condenser and said sub-cooler coil including a first metering device;

a second valved conduit fluidically coupled between said condenser and said sub-cooler coil bypassing said first metering device, said second valved conduit including a first flow control valve;

a third valved conduit fluidically coupled between said sub-cooler coil and said evaporator including a second metering device; and a fourth valved conduit fluidically coupled between said sub-cooler and said compressor including a second flow control valve;

wherein in said first mode said first metering device and said second flow control valve disposed in an open condition and said first flow control valve and said second metering device disposed in a closed condition, wherein in said second mode said first metering device and said second flow control valve disposed in a closed condition and said first flow control valve and said second metering device in an open condition.

14. The apparatus of claim 13, further comprising an airflow generator associated with said secondary heat exchanger.

15. The apparatus of claim 14, wherein in said first mode said airflow generator is in an on condition and wherein in said second mode said airflow generator is in said on condition.

16. The apparatus of claim 15, further comprising:

a first metering device actuator operable to dispose said first metering device in said open condition or in said closed condition;

a second metering device actuator operable to dispose said second metering device in said open condition or in said closed condition;

a first flow control valve actuator operable to dispose said first flow control valve in said open condition or in said closed condition;

a second flow control valve actuator operable to dispose said second flow control valve in said open condition or in said closed condition; and an airflow generator actuator operable to dispose said airflow generator in said on condition or in said off condition.

17. The apparatus of claim 16, further comprising a temperature sensor thermally coupled to a refrigerant flowing through said condenser of said heat pump, said temperature sensor generates a temperature sensor signal which varies based upon a refrigerant temperature.

18. The apparatus of claim 17, further comprising a controller having a processor communicatively coupled to a non-transitory computer readable medium containing a mode switching program, said mode switching program analyzes said temperature sensor signal to determine said refrigerant temperature.

19. The apparatus of claim 18, wherein said mode switching program functions to switch between said first mode and said second mode based on said refrigerant temperature.

20. The apparatus of claim 19, wherein said mode switching program in said first mode functions to:
   operate said first metering device valve actuator to dispose said first metering device in said open condition;
   operate said second metering device actuator to dispose said second metering device in said closed condition;
   operate said first flow control valve actuator to dispose said first flow control valve in said closed condition;
   operate said second flow control valve actuator to dispose said second flow control valve in said open condition; and
   operate said airflow generator actuator to dispose said airflow generator in said on condition.

21. The apparatus of claim 19, wherein said mode switching program in said second mode functions to:
   operate said first metering device actuator to dispose said first metering device in said closed condition;
   operate said second metering device actuator to dispose said second metering device in said open condition;
   operate said first flow control valve actuator to dispose said first flow control valve in said closed condition;
   operate said second flow control valve actuator to dispose said second flow control valve in said open condition; and
   operate said airflow generator actuator to dispose said airflow generator in said on condition.

22. The apparatus of claim 3, wherein said mode switching program in said first mode functions to:
   operate a metering device actuator to dispose said metering device in said open condition;
   operate a first flow control valve actuator to dispose a first flow control valve in an open condition;
   operate a second flow control valve actuator to dispose a second flow control valve in said closed condition; and
   operate an airflow generator actuator to dispose an airflow generator in said on condition or in said off condition.

23. The apparatus of claim 22, wherein said mode switching program in said second mode functions to:
   operate said metering device actuator to dispose said metering device in said open condition;
   operate said first flow control valve actuator to dispose said first flow control valve in said closed condition;
   operate said second flow control valve actuator to dispose said second flow control valve in said open condition; and
   operate said airflow generator actuator to dispose said airflow generator in an off condition.

* * * * *